(12) United States Patent  (10) Patent No.: US 8,571,345 B2
Minakawa et al.  (45) Date of Patent:  Oct. 29, 2013

(54) METHOD AND DEVICE FOR CORRECTING IMAGE, AND METHOD AND DEVICE FOR GENERATING CORRECTION TABLE FOR USE IN CORRECTION OF IMAGE

(75) Inventors: Tsuyoshi Minakawa, Yokohama (JP); Tatsuzo Hamada, Hadano (JP)

(73) Assignee: Hitachi Information & Communication Engineering, Ltd., Kanagawa (JP)

( * ) Notice: Subject to any disclaimer, the term of this patent is extended or adjusted under 35 U.S.C. 154(b) by 108 days.

(21) Appl. No.: 13/245,451

(22) Filed: Sep. 26, 2011

(65) Prior Publication Data

US 2012/0106866 A1  May 3, 2012

(30) Foreign Application Priority Data

Oct. 29, 2010 (JP) ................................. 2010-243503

(51) Int. Cl.
*G06K 9/40* (2006.01)
*G06K 9/36* (2006.01)

(52) U.S. Cl.
USPC ......................................... 382/274; 382/276

(58) Field of Classification Search
USPC ..................... 382/274, 275, 285, 286, 276
See application file for complete search history.

(56) References Cited

U.S. PATENT DOCUMENTS

| | | | |
|---|---|---|---|
| 6,346,967 B1 * | 2/2002 | Gullichsen et al. | 348/207.99 |
| 7,961,980 B2 | 6/2011 | Shih | |
| 8,094,170 B2 * | 1/2012 | Kato et al. | 345/647 |
| 8,300,061 B2 * | 10/2012 | Hasegawa | 345/589 |
| 2004/0260469 A1 | 12/2004 | Mizusawa | |

FOREIGN PATENT DOCUMENTS

| | | |
|---|---|---|
| JP | 2001005956 A | 1/2001 |
| JP | 2008311890 A | 12/2008 |
| JP | 2001184040 A | 7/2011 |

OTHER PUBLICATIONS

Xianghua Ying et al: "Fisheye Lenses Calibration Using Straight-Line Spherical Perspective Projection Constraint", Jan. 13, 2006, Computer Vision—ACCV 2006 Lecture Notes in Computer Science; LNCS, Springer, Berlin, DE, pp. 61-70.

* cited by examiner

*Primary Examiner* — Yon Couso
(74) *Attorney, Agent, or Firm* — Volpe & Koenig, P.C.

(57) ABSTRACT

An image correction device geometrically corrects an input image, based on the correction table, which is generated by obtaining a light-direction vector in an objective space corresponding to each pixel position on a corrected image, based on a first projection center located on the rear side of a second projection center as the projection center of the input image in the objective space with respect to the direction of an optical axis corresponding to the input image, obtaining from the light-direction vector an origin-based light-direction vector indicating a direction from the second projection center in which a point corresponding to each pixel position exists in the objective space, exacting a position on the input image corresponding to the origin-based light-direction vector, and recording in the correction table the resampling position in correspondence with each pixel position in the corrected image.

8 Claims, 22 Drawing Sheets

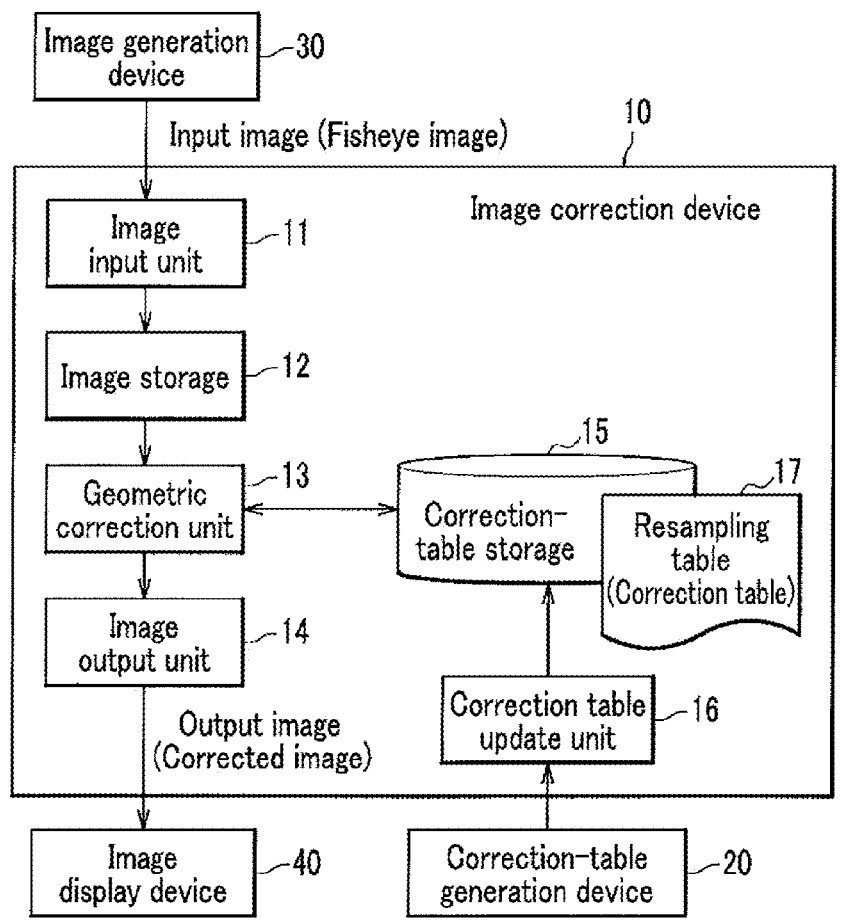

FIG.5A

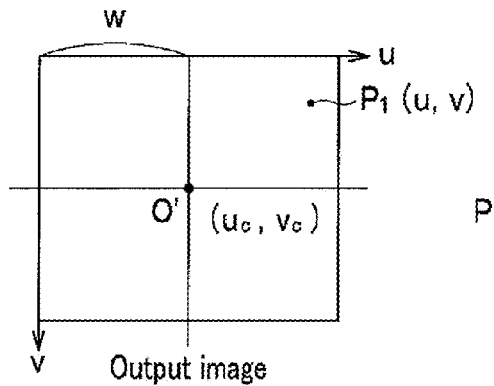

Output image

FIG.5B

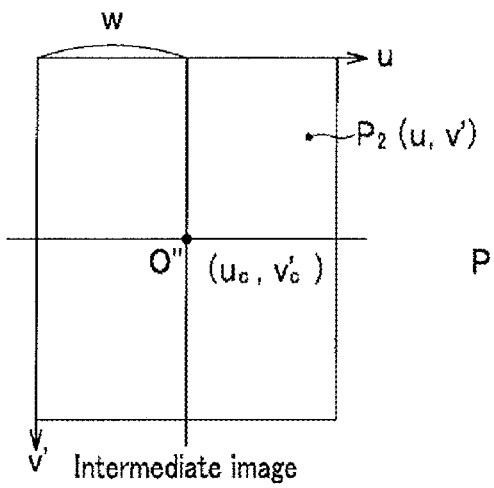

Intermediate image $P_1 (u, v)$

↓

Equation (4)
$$\Delta v = \beta \cdot w \cdot \left(\frac{v - v_c}{w}\right)^2 \quad (\beta = 0.5)$$

Equation (5)
$$v' = \begin{cases} (v - \Delta v) - v_c + v'_c & \text{if } v - v_c < 0, \\ (v + \Delta v) - v_c + v'_c & \text{otherwise.} \end{cases}$$

↓

$P_2 (u, v')$

↓

Equation (1)
$$\begin{cases} X' = r \cdot \sin\theta \\ Y' = \dfrac{v' - v'_c}{w} \cdot (r \cdot \sin\Theta) \\ Z' = r \cdot \cos\theta \\ \text{where} \\ r = \dfrac{1}{1 - \cos\Theta}, \quad \theta = \dfrac{u - u_c}{w} \cdot \Theta \end{cases}$$

↓

Receded-position-based light-direction vector QK1 (X', Y', Z') in Fig. 6A

FIG.6A

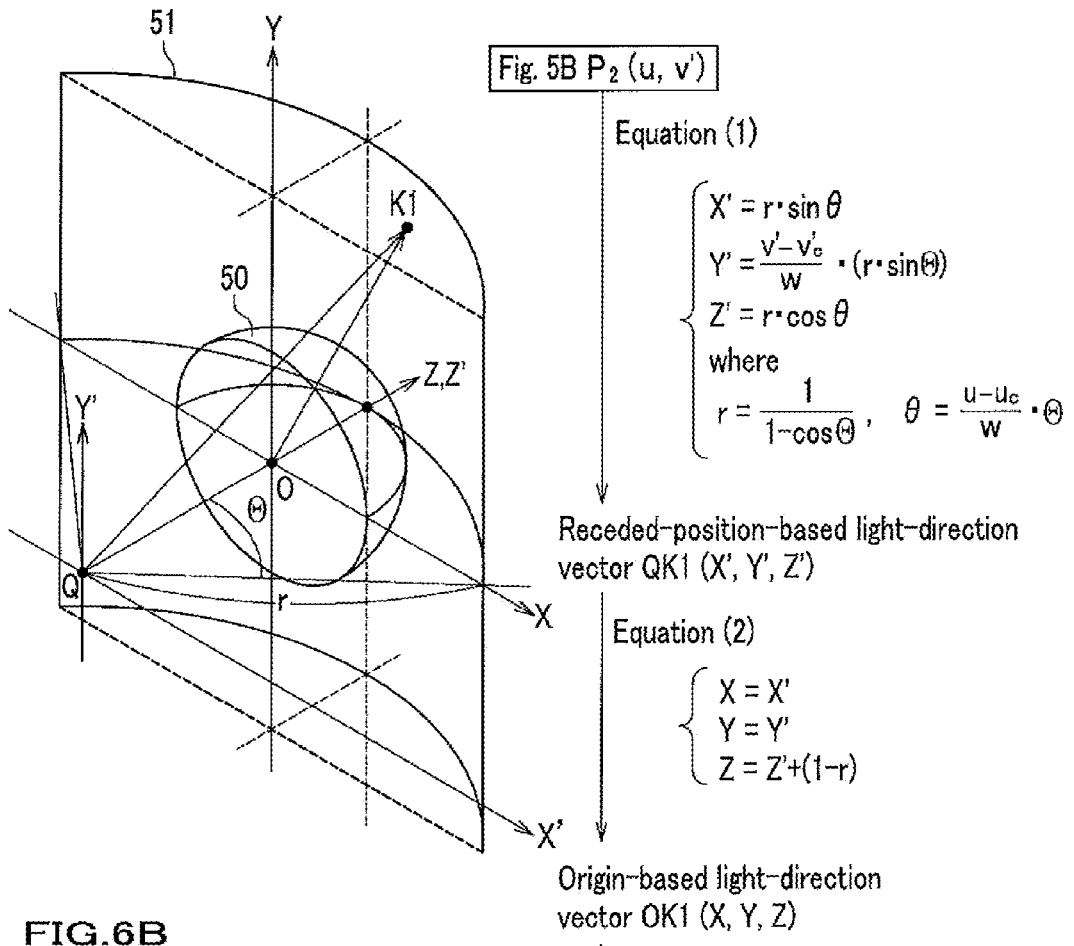

Fig. 5B P$_2$ (u, v')

↓ Equation (1)

$$\begin{cases} X' = r \cdot \sin\theta \\ Y' = \dfrac{v' - v'_c}{w} \cdot (r \cdot \sin\theta) \\ Z' = r \cdot \cos\theta \end{cases}$$

where $$r = \dfrac{1}{1 - \cos\Theta}, \quad \theta = \dfrac{u - u_c}{w} \cdot \Theta$$

Receded-position-based light-direction vector QK1 (X', Y', Z')

↓ Equation (2)

$$\begin{cases} X = X' \\ Y = Y' \\ Z = Z' + (1 - r) \end{cases}$$

Origin-based light-direction vector OK1 (X, Y, Z)

↓ Equation (3)

$$\begin{cases} x = x_c + \dfrac{X}{\sqrt{X^2 + Y^2}} \cdot \left\{ \dfrac{2}{\pi} \cdot R \cdot \cos^{-1}\left(\dfrac{Z}{\sqrt{X^2 + Y^2 + Z^2}}\right) \right\} \\ y = y_c + \dfrac{Y}{\sqrt{X^2 + Y^2}} \cdot \left\{ \dfrac{2}{\pi} \cdot R \cdot \cos^{-1}\left(\dfrac{Z}{\sqrt{X^2 + Y^2 + Z^2}}\right) \right\} \end{cases}$$

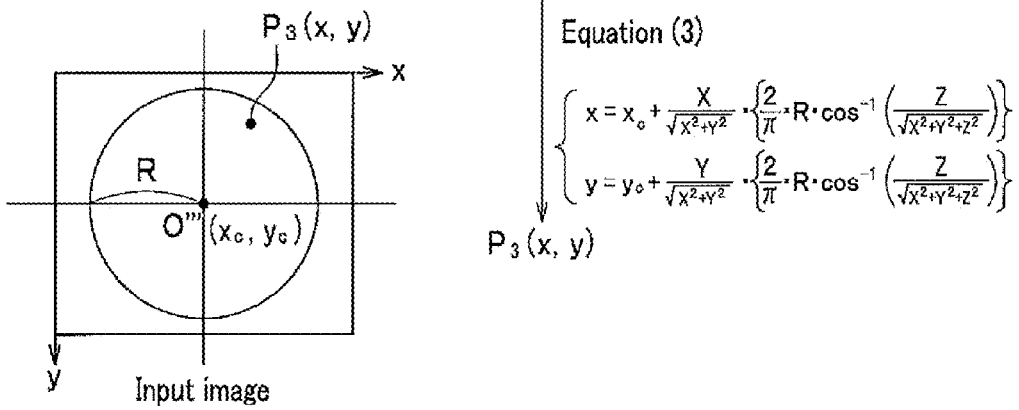

Input image

FIG.12A

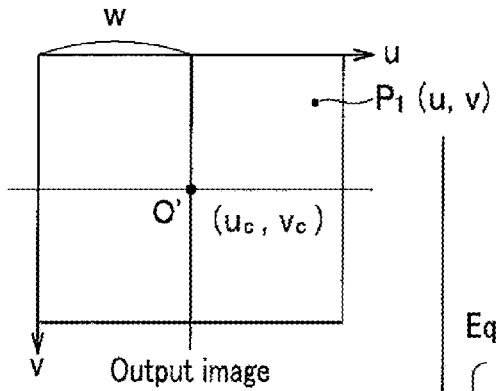

Output image

FIG.12B

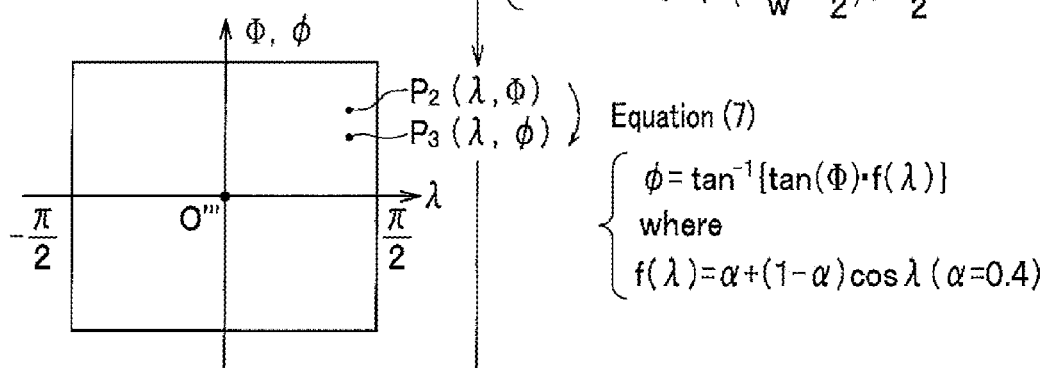

Equation (6)

$$\begin{cases} \lambda = \frac{u-u_c}{w} \cdot \Theta \\ \Phi = 2\tan^{-1}\left[\exp\left(\frac{v-v_c}{w} \cdot \frac{\pi}{2}\right)\right] - \frac{\pi}{2} \end{cases}$$

Equation (7)

$$\begin{cases} \phi = \tan^{-1}[\tan(\Phi) \cdot f(\lambda)] \\ \text{where} \\ f(\lambda) = \alpha + (1-\alpha)\cos\lambda \quad (\alpha = 0.4) \end{cases}$$

Equation (8)

$$\begin{cases} X' = \sin\lambda \cdot \cos\phi \\ Y' = \sin\phi \\ Z' = \cos\lambda \cdot \cos\phi \end{cases}$$

Receded-position-based light-direction vector QK0 (X', Y', Z') in Fig. 13A

METHOD AND DEVICE FOR CORRECTING IMAGE, AND METHOD AND DEVICE FOR GENERATING CORRECTION TABLE FOR USE IN CORRECTION OF IMAGE

CROSS-REFERENCE TO RELATED APPLICATIONS

This application claims the foreign priority benefit under 35 U.S.C. §119 of Japanese Patent Application No. 2010-243503, filed on Oct. 29, 2010, the disclosure of which is incorporated herein by reference.

BACKGROUND OF THE INVENTION

1. Field of the Invention

The present invention relates to a method and a device for correcting an image captured by use of a fisheye lens or the like, and to a computer-readable non-transitory medium storing a program for correcting an image captured by use of a fisheye lens or the like. In addition, the present invention relates to a method and a device for generating a correction table for use in correction of an image captured by use of a fisheye lens or the like, and to a computer-readable non-transitory medium storing a program for generating a correction table for use in correction of an image captured by use of a fisheye lens or the like.

2. Description of the Related Art

In recent years, in some fields including the monitoring camera system and the video doorphone system, there have been demands for a wide field of view in one glance. Therefore, devices such as video cameras including a fisheye lens in an optical system and taking images with a horizontal angle of view of approximately 180 degrees have been brought to the marketplace. However, straight lines in the objective space (for example, straight lines in the real world) are generally greatly curved in the images taken by use of the above devices. Thus, geometrical correction for reducing the degree of distortion in the captured images is currently demanded.

Various projection methods including the equidistance projection, equi-solid angle projection, and orthographic projection are used in designing fisheye lenses. However, regardless of the projection method used in designing the fisheye lenses, it is possible to completely correct the distortion of the images of straight lines captured by use of a fisheye lens, by using perspective transformation based on design values and given parameters estimated by a conventional technique, as long as the angles of view to be represented in the corrected images are less than 180 degrees.

FIGS. 18A and 19A show examples of fisheye images. The example of 18A is an image of a hollow paper cylinder, and FIG. 19A is an image of an entrance hall. Further, FIGS. 18B and 19B respectively show examples of corrected images of the fisheye images of FIGS. 18A and 19A, where the fisheye images of FIGS. 18A and 19A are corrected by use of the perspective transformation such that the angle of view in the left/right direction is ensured to be wide. As is clear in the above examples, objects in the objective space which are to be represented by linear (straight) images are actually represented by linear (straight) images. However, in the corrected images, the peripheral regions are extremely enlarged and the depth perception is exaggerated. Consequently, the corrected images arouse a strong feeling of strangeness. This is a problem caused by a significant difference between the angle of view represented by the corrected image and the angle of view of viewing that image.

Japanese Patent Laid-open No. 2008-311890 (which is hereinafter referred to as JP2008-311890A) discloses a technique which is contrived by an attempt to solve the above problem. According to the technique disclosed in JP2008-311890A, a correction is made by using a cylindrical surface which is formed with a left portion, a front portion, and a right portion which are each an approximately flat surface and are smoothly connected, and the correction is made in such a manner that an angle of view in the left/right direction exceeding 180 degrees is achieved and each of linear objects which extend in the vertical direction or radial directions converging to the optical center (optical axis) are represented by linear images in the corrected image.

SUMMARY OF THE INVENTION

However, according to the technique disclosed in JP2008-311890A, straight lines in the horizontal direction in the objective space are steeply curved in the vicinities of the midpoint position between the central region and the region near the left edge of the output image and the midpoint position between the central region and the region near the right edge of the output image. Therefore, when an object passes by the camera, the corrected image arouses a feeling of strangeness.

The present invention has been developed in view of the above circumstances. A first object of the present invention is to provide a method and a device for correcting an image captured by use of a fisheye lens or the like, in such a manner that the feeling of strangeness caused by the corrected image is reduced or removed. A second object of the present invention is to provide a computer-readable non-transitory medium storing a program for correcting an image captured by use of a fisheye lens or the like, in such a manner that the feeling of strangeness caused by the corrected image is reduced or removed. A third object of the present invention is to provide a method and a device for generating a correction table for use in the above method and device achieving the first object. A fourth object of the present invention is to provide a computer-readable non-transitory medium storing a program for generating a correction table for use in the above method and device achieving the first object.

In order to accomplish the first object, the present invention provides an image correction device which generates a corrected image by geometric correction of an input image. The image correction device includes: an image input unit which receives the input image; an image storage unit which stores the input image; a correction-table storage unit which stores a correction table containing information for use in the geometric correction of the input image; a geometric correction unit which geometrically corrects the input image stored in the image storage unit, based on the correction table; an image output unit which outputs as the corrected image the input image geometrically corrected by the geometric correction unit. The correction table is generated by obtaining a light-direction vector in an objective space corresponding to each pixel position on the corrected image, based on a first projection center which is located on the rear side of a second projection center as a projection center of the input image in the objective space with respect to the direction of an optical axis corresponding to the input image, obtaining from the light-direction vector an origin-based light-direction vector indicating the direction from the second projection center in which a point corresponding to each pixel position exists in the objective space, obtaining as a resampling position a position on the input image corresponding to the origin-based light-direction vector, and recording in the correction table the resampling position in correspondence with each pixel position in the corrected image.

According to the present invention, for example, the aforementioned fisheye images shown in FIGS. 18A and 19A can be respectively corrected to the images shown in FIGS. 18D and 19C.

BRIEF DESCRIPTION OF THE DRAWINGS

FIG. 1 is a diagram illustrating a configuration of an image correction device according to the present invention;

FIG. 2 is a diagram schematically illustrating an example of a correction table used in the present invention;

FIG. 5A is a diagram showing a transformation from a set of coordinates of each pixel in an output image to a set of coordinates of an intermediate image;

FIG. 5B is a diagram showing a transformation from the set of coordinates of each pixel in the intermediate image to a receded-position-based light-direction vector;

FIGS. 6A and 6B are diagrams showing a transformation from the set of coordinates of each pixel in the intermediate image to the receded-position-based light-direction vector, a transformation from the receded-position-based light-direction vector to an origin-based light-direction vector, and a transformation from the origin-based light-direction vector to a set of coordinates of each pixel in an input image;

FIGS. 12A and 12B are diagrams showing a transformation from a set of coordinates of each pixel in an output image to a set of coordinates in a longitude-latitude coordinate system, a correction of the latitude, and a transformation from the corrected set of coordinates in the longitude-latitude coordinate system to a receded-position-based light-direction vector;

DETAILED DESCRIPTION OF THE PREFERRED EMBODIMENT

Figure 3:
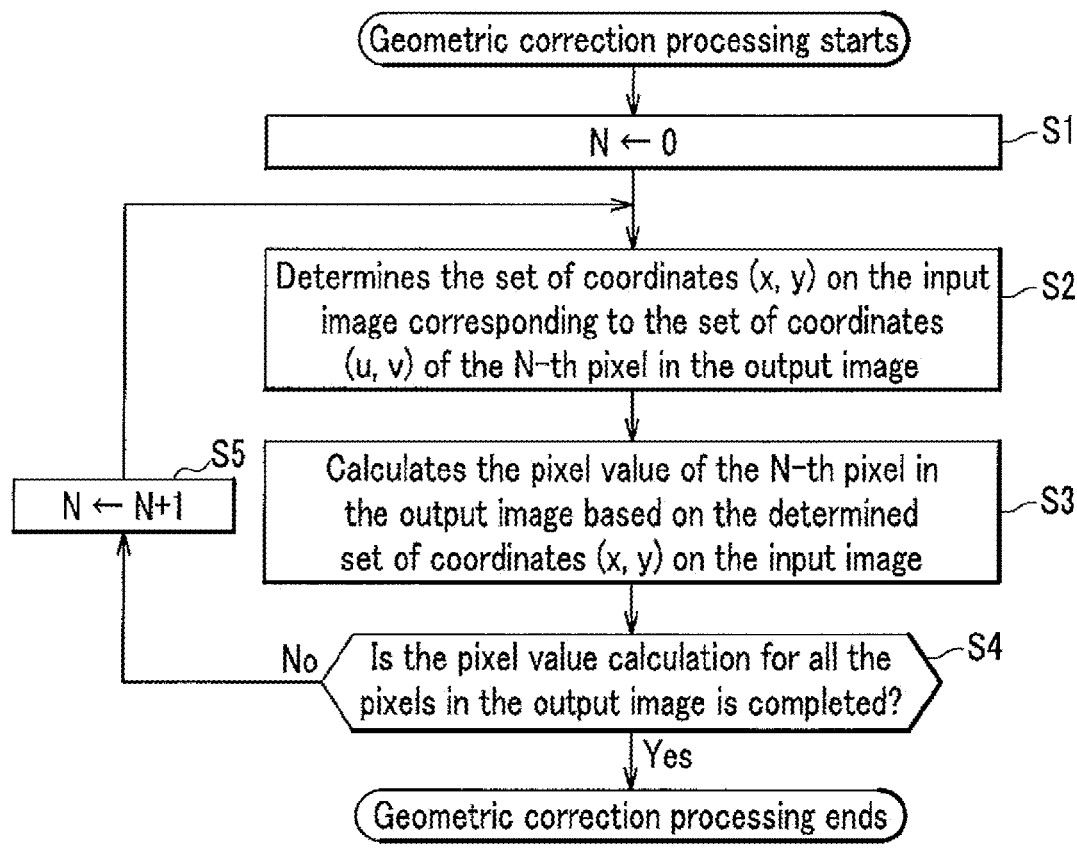
FIG. 3 is a flow diagram showing operations of a geometric correction unit in the image correction device according to the present invention.

1. First Embodiment
1.1 Outline of First Embodiment

The image correction device according to the first embodiment of the present invention is explained below with reference to the FIGS. 1 to 10. The image correction device 10 according to the first embodiment has the configuration illustrated in FIG. 1, receives an input image such as a fisheye image, corrects the input image, and outputs the corrected image as an output image. The image generation device 30 generates image data of the input image, and supplies the image data to the image correction device 10. The following explanations on the first embodiment are presented for an exemplary case where the image generation device 30 is a digital video camera having a circular fisheye lens based on the equidistance projection method with the horizontal and vertical angles of view of 180 degrees. The image display device 40 displays the corrected image outputted from the image correction device 10.

The correction-table generation device 20 generates a correction table 17 which is to be stored in a correction-table storage 15 in the image correction device 10. (The correction-table storage 15 will be explained later.) The correction-table generation device 20 is realized by, for example, a computer.

The correction-table generation device 20 supplies the correction table 17 to the image correction device 10 after the correction table 17 is generated before a geometric correction unit 13 performs processing for geometric correction by use of the correction table 17. However, in the case where the correction table 17 is not required to be updated, i.e., in the case where parameters concerning the generation of the correction table 17 are not changed, the correction-table generation device 20 can be separated from the image correction device 10 after the correction table 17 generated by the correction-table generation device 20 is transmitted to the image correction device 10.

1.2 Configuration of Image Correction Device 10

The configuration of the image correction device 10 is explained below with reference to FIG. 1. As illustrated in FIG. 1, the image correction device 10 includes an image input unit 11, an image storage 12, the geometric correction unit 13, an image output unit 14, the correction-table storage 15, and a correction-table update unit 16.

The image input unit 11 reads in the input image supplied from the image generation device 30, and writes the input image in the image storage 12. The pixel value of each pixel in the input image is one of the 256 integer values in the range of 0 to 255 for each of the primary colors (the three primary colors R (Red), G (Green), and B (Blue) in this embodiment).

The input image can be read in from the image generation device 30 by using an interface corresponding to the configuration of the image generation device 30. For example, in the case where the input image is supplied from the image generation device 30 as analog signals, an analog-to-digital converter may be provided in the image input unit 11. In the case where the input image is supplied in the form of a digital signal through a USB (Universal Serial Bus) interface or the like, a corresponding interface circuit may be provided in the image input unit 11.

The image storage 12 is provided with a memory (RAM: Random Access Memory) with a capacity that allows storage corresponding to at least two full frames of input images supplied from the image generation device 30. Two independent parts of the capacity of the image storage 12 are alternately used for two purposes; one is a frame buffer into which the image input unit 11 writes one frame of the input image, and the other is a frame buffer from which the geometric correction unit 13 refers pixel values of the previous frame of the input image.

The geometric correction unit 13 performs geometric correction on the input image stored in the image storage 12, based on the correction table 17 stored in the correction-table storage 15, and outputs to the image output unit 14 the result of the geometric correction as the output image (corrected image). The geometric correction unit 13 can be realized by, for example, an FPGA (Field Programmable Gate Array) or an ASIC (Application Specific Integrated Circuit). Details of the processing performed by the geometric correction unit 13 will be explained later (with reference to FIG. 3).

The image output unit 14 transforms the output image (corrected image) outputted from the geometric correction unit 13, into an appropriate video signal, and outputs the video signal to the image display device 40. For example, in the case where the image display device 40 is configured to display analog video signals, a digital-to-analog converter may be provided in the image output unit 14.

The correction-table storage 15 stores the correction table 17, and is, for example, a rewritable nonvolatile memory. The correction-table update unit 16 receives a correction table 17 transmitted from the correction-table generation device 20 and stores it in the correction-table storage 15. The correction-table update unit 16 can be configured, for example, with a USB interface or an IEEE1394 interface that matches the interface on the side of the correction-table generation device 20.

In the correction table 17, it is determined which pixels of the input image (fisheye image) stored in the image storage 12 are to be referred to in determining the pixel values of the respective pixels of the output image (corrected image) which is to be output from the geometric correction unit 13. In the present embodiment, a resampling table is used as the correction table 17. Specifically, the resampling table is a table indicating a set of the two-dimensional coordinates (x, y) (in fixed-point representation) on the input image (stored in the image storage 12) in a correspondence with each pixel of the output image to be outputted from the geometric correction unit 13. The correction-table generation device 20 generates the correction table 17 in the manner explained later (with reference to FIGS. 8 to 10), and thereafter the correction-table update unit 16 stores the correction table 17 in the correction-table storage 15.

For example, as illustrated in FIG. 2, the resampling table (correction table) 17 indicates the correspondences between the sets of pixel coordinates (u, v) on the output image and the sets of coordinates (x, y) on the input image. The resampling table in the example of FIG. 2 is provided for the output image having 640 pixels in the u direction and 480 pixels in the v direction. Although u and v are integers, x and y are not necessarily integers. In addition, when the set of coordinates (x, y) obtained in correspondence with a set of coordinates (u, v) on the output image is out of the range of the input image, a predetermined set of exceptional coordinates, for example, (−1, −1) are stored in correspondence with the set of coordinates (u, v) on the output image.

1.3 Operations of Geometric Correction Unit 13

The operations of the geometric correction unit 13 in the image correction device 10 are explained below with reference to FIG. 3. (FIG. 1 is also referred to for the configuration of the image correction device 10 when necessary.) In the following explanations, it is assumed that the input image is stored in the image storage 12 and the resampling table (correction table) 17 is stored in the correction-table storage 15.

In step S1, the geometric correction unit 13 sets the count N of a counter to "0".

In step S2, the geometric correction unit 13 determines the set of coordinates (x, y) on the input image corresponding to the set of coordinates (u, v) of the N-th pixel in the output image. Specifically, first, the geometric correction unit 13 calculates as the set of coordinates (u, v) of the N-th pixel in the output image the remainder u and the quotient v obtained by division of the count N of the counter by the number of pixels arrayed in the u-axis direction in the output image. (That is, when the number of pixels arrayed in the u-axis direction is B, N=v·B+u.) Then, the geometric correction unit 13 determines the set of coordinates (x, y) on the input image corresponding to the set of coordinates (u, v) of the N-th pixel on the output image, based on the resampling table (correction table) 17.

In step S3, the geometric correction unit 13 calculates the pixel value of the N-th pixel in the output image, based on the determined set of coordinates (x, y) on the input image. For example, it is possible to determine the pixel value of the N-th pixel in the output image from the set of coordinates (x, y) on the input image by performing bilinear interpolation using the four nearest pixels on the input image for each of the primary colors (R, G, and B). Alternatively, the pixel values of the output image may be calculated by one of other conventional techniques such as bicubic interpolation.

In addition, when the input image does not include the set of coordinates (x, y) corresponding to the determined set of coordinates (u, v), i.e., when the set of coordinates (x, y) determined based on the correction table 17 is the predetermined set of exceptional coordinates, the geometric correction unit 13 determines the pixel value of the corresponding pixel (u, v) in the output image to be a predetermined exceptional pixel value, for example, (R, G, B)=(0, 0, 0) corresponding to black.

In step S4, the geometric correction unit 13 determines whether or not the pixel value calculation for all the pixels in the output image is completed, for example, by comparing the count N with the total number of pixels in the output image. When yes is determined in step S4, the geometric correction unit 13 completes the processing for geometric correction. When no is determined in step S4, the geometric correction unit 13 increments the count N of the counter by one in step S5. Thereafter, the operation goes back to step S2.

1.4 Configuration of Correction-table Generation Device 20

Figure 4:
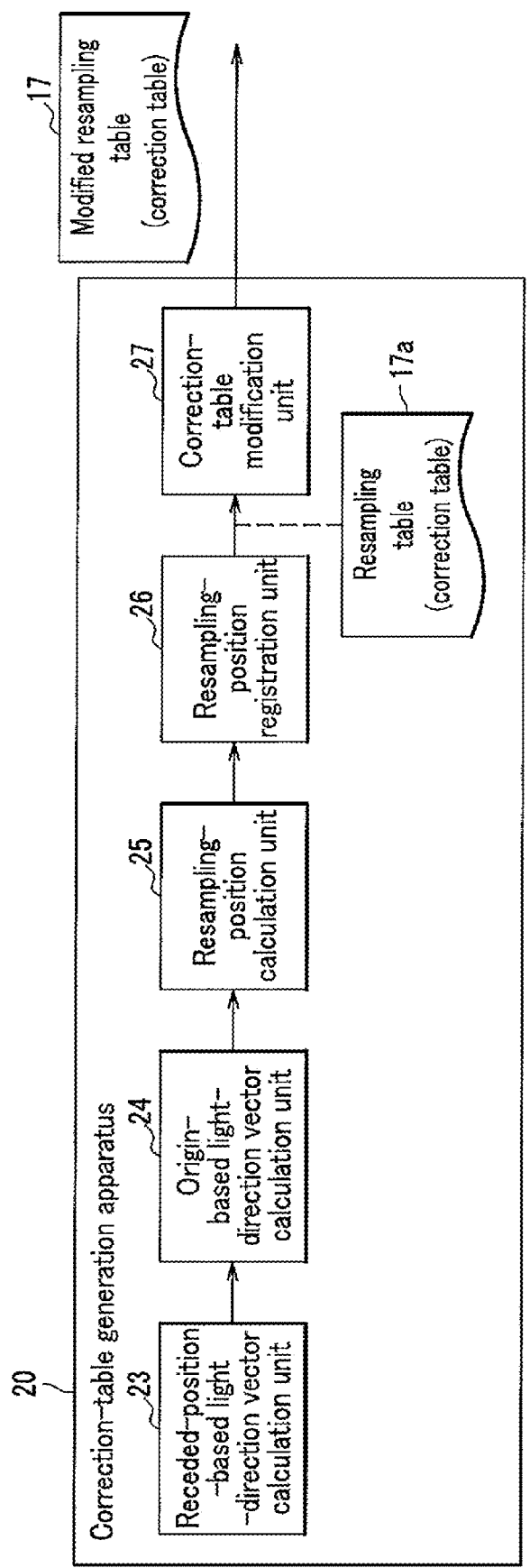
FIG. 4 is a block diagram showing a configuration of a correction-table generation device according to a first embodiment of the present invention.

The configuration of the correction-table generation device 20 is explained below with reference to FIG. 4. As illustrated in FIG. 4, the correction-table generation device 20 includes a receded-position-based light-direction calculation unit 23, an origin-based light-direction calculation unit 24, a resampling-position calculation unit 25, a resampling-position recording unit 26, and a correction-table modification unit 27. In the correction-table generation device 20 of FIG. 4, a resampling table (correction table) 17a is outputted from the resampling-position recording unit 26, and is then corrected by the correction-table modification unit 27 to the corrected resampling table (correction table) 17, so that the correction-table generation device 20 outputs the corrected resampling table (correction table) 17. In the case where it is unnecessary to correct the resampling table (correction table) 17, the correction-table modification unit 27 can be dispensed with. In this case, the intermediate image generated in the operations explained below can be regarded as the output image.

The receded-position-based light-direction calculation unit 23 calculates as the receded-position-based light-direction vector QK1 (X', Y', Z') a light-direction vector in the objective space corresponding to a set of coordinates (u, v') on the intermediate image. (The receded-position-based light-direction vector QK1 (X', Y', Z') is explained later.) The intermediate image corresponds to an image generated by correcting the input image by use of the resampling table (correction table) 17a, which is not yet corrected.

The receded-position-based light-direction calculation unit 23 calculates the receded-position-based light-direction vector (X', Y', Z') from the set of coordinates (u, v') on the intermediate image by using the equations (1), where the center O' of the output image has the set of coordinates ($u_c$, $v_c$), and the center O'' of the intermediate image has the set of coordinates ($u_c$, $v'_c$).

$$\begin{cases} X' = r \cdot \sin\theta \\ Y' = \dfrac{v' - v'_c}{w} \cdot (r \cdot \sin\Theta) \\ Z' = r \cdot \cos\theta \\ \text{where } r = \dfrac{1}{1 - \cos\Theta} \text{ and } \theta = \dfrac{u - u_c}{w} \cdot \Theta \end{cases} \quad (1)$$

That is, a coordinate transformation from the uv' coordinate system on the intermediate image illustrated in FIG. 5B to the X'Y'Z' coordinate system illustrated in FIG. 6A is performed. In the illustration of the intermediate image in FIG. 5B, the set of coordinates of the center O'' of the intermediate image is located at the set of coordinates ($u_c$, $v'_c$). In the equations (1), w is a constant for normalizing the scale in the u-axis direction, and is set to the value equal to $u_c$. In addition, in order to secure the total consistency in the scale of the output image and the intermediate image, w is also used for normalization of the scale in v-axis direction and the v'-axis direction.

Further, in FIG. 6A, Θ corresponds to the half angle of view in the receded-position-based system, and is given in advance as a design value. The point $P_2$(u, v') on the intermediate image is transformed to a receded-position-based light-direction vector QK1(X', Y', Z'), where K1 is a point on the cylindrical surface 51. The reason for the transformation will be explained later.

The origin-based light-direction calculation unit 24 calculates an origin-based light-direction vector OK1(X, Y, Z) from the receded-position-based light-direction vector QK1 (X', Y', Z') by using the equations (2).

$$\begin{cases} X = X' \\ Y = Y' \\ Z = Z' + (1 - r) \end{cases} \quad (2)$$

The above calculation realizes a transformation from the X'Y'Z' coordinate system to the XYZ coordinate system as illustrated in FIGS. 6A and 6B, so that the receded-position-based light-direction vector QK1(X', Y', Z') is converted to the origin-based light-direction vector OK1(X, Y, Z).

The resampling-position calculation unit 25 calculates from the origin-based light-direction vector OK1(X, Y, Z) a set of coordinates (x, y) on the input image as a resampling position. The resampling position is a set of coordinates (x, y) on the input image, and indicates the position on the input image from which the pixel value is to be extracted for the pixel at the set of coordinates (u, v) on the output image or at the set of coordinates (u, v') on the intermediate image. Since the input image in the present embodiment is captured by use of a fisheye lens based on the equidistance projection, the resampling-position calculation unit 25 calculates the set of coordinates (x, y) on the input image by using the equations (3).

$$\begin{cases} x = x_c + \left(X/\sqrt{X^2+Y^2}\right) \cdot \left\{\dfrac{2}{\pi} \cdot R \cdot \cos^{-1}\left(Z/\sqrt{X^2+Y^2+Z^2}\right)\right\} \\ y = y_c + \left(Y/\sqrt{X^2+Y^2}\right) \cdot \left\{\dfrac{2}{\pi} \cdot R \cdot \cos^{-1}\left(Z/\sqrt{X^2+Y^2+Z^2}\right)\right\} \end{cases} \quad (3)$$

The above calculation realizes a transformation from the XYZ coordinate system to the xy coordinate system as illustrated in FIGS. 6A and 6B, so that the origin-based light-direction vector OK1(X,Y, Z) is transformed to the pixel $P_3(x, y)$. In the illustration of the input image in FIG. 6B, $O'''(x_c, y_c)$ is the set of coordinates of the center of the image circle of the input image, and R is the radius of the image circle and corresponds to the half angle of view of 90 degrees. The values of $x_c$, $y_c$, and R are recorded as design values in advance in the correction-table generation device 20. The types of the imaging parameters in the present invention are not limited to the parameters mentioned as above, and can be changed according to the used projection model. In addition, some imaging parameters may be estimated from one or more input images by using a conventional technique. For example, the set of coordinates $(x_c, y_c)$ of the center of the image circle and the radius R of the image circle can be estimated by utilizing a conventional technique for estimation of a circle, using the fact that the regions of the input image outside the image circle are normally almost black (i.e., the R, G, and B values in the pixel values in the regions of the input image outside the image circle are very small). Further, instead of the use of the equations (3), it is possible to use some conventional formulas for correction of distortion in optical systems in which higher order terms are included.

The resampling-position recording unit 26 records in the resampling table (correction table) 17a the sets of coordinates (x, y) on the input image calculated by the resampling-position calculation unit 25, in correspondence with the set of coordinates (u, v') on the intermediate image. As mentioned before, when the set of coordinates (x, y) on the input image calculated by the resampling-position calculation unit 25 is out of the range of the input image, the predetermined set of exceptional coordinates, for example, (−1, −1) are stored in correspondence with the set of coordinates (u, v') on the intermediate image.

When the image correction device 10 corrects the input image by using the resampling table (correction table) 17a generated as above, the intermediate image is generated. In order to obtain the output image, which is corrected further than the intermediate image, the correction-table modification unit 27 is provided in the correction-table generation device 20.

Figure 18A:
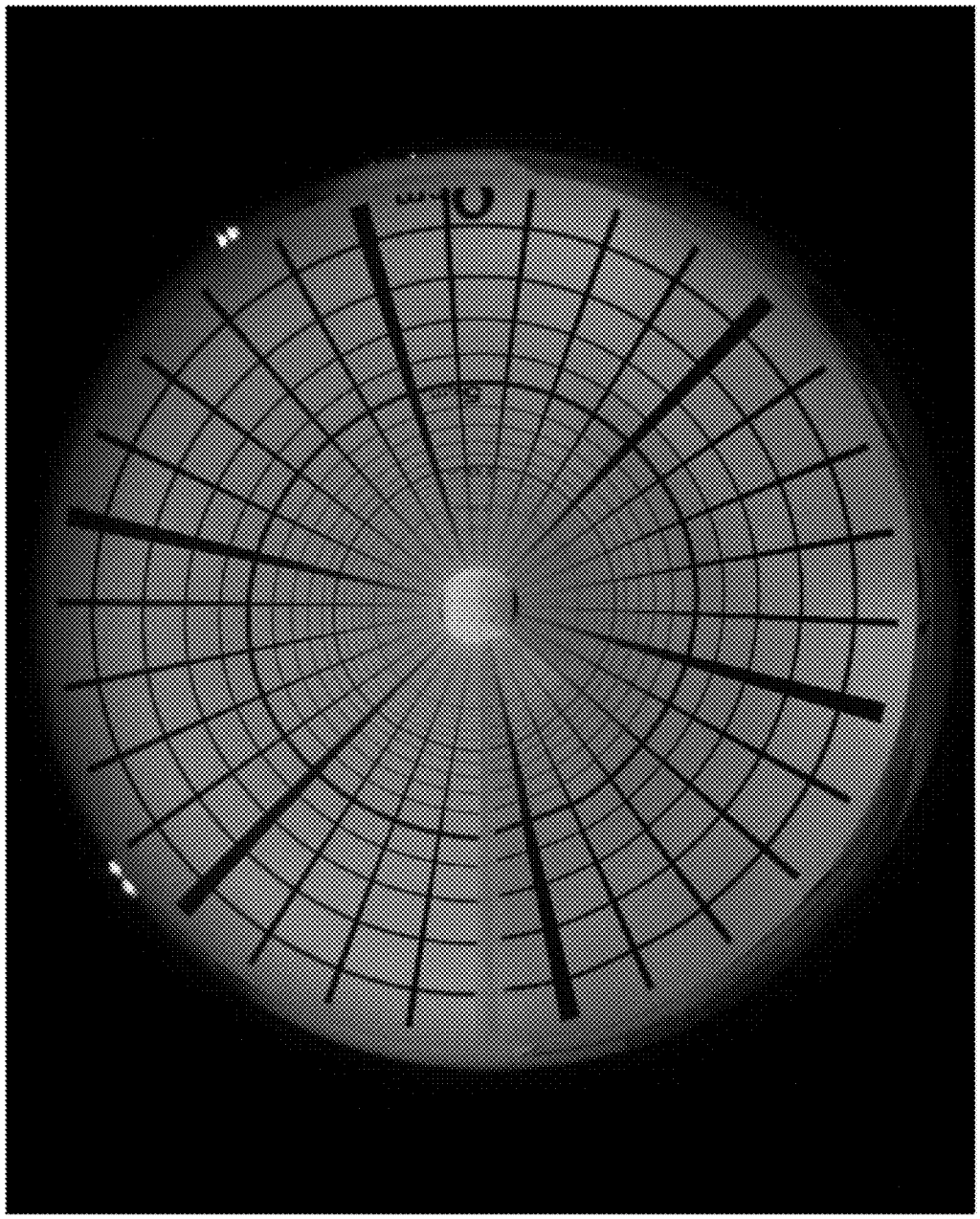
FIG. 18A is a diagram showing an example of a fisheye image as an input image.
Figure 18B:
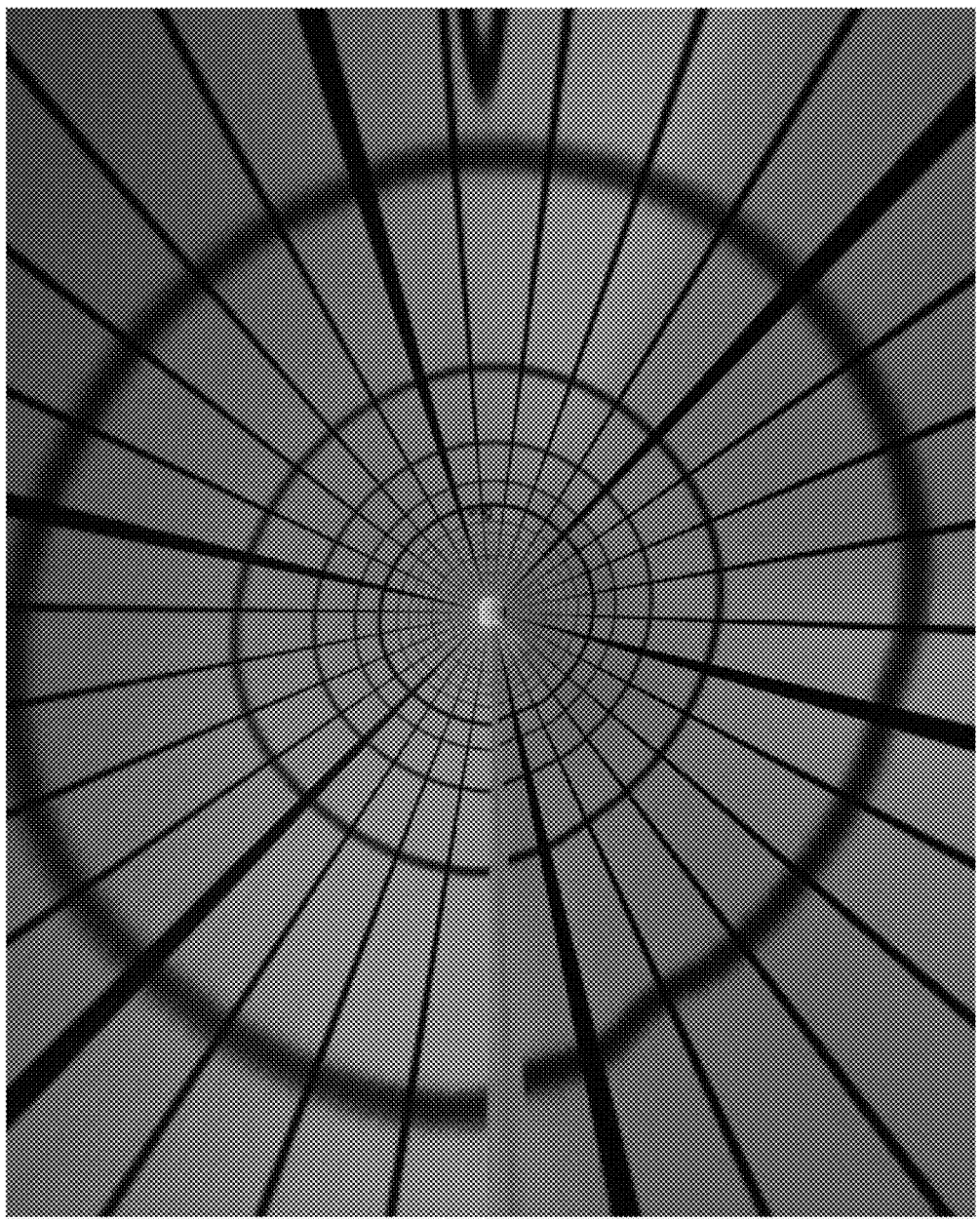
FIG. 18B is a diagram showing an example of a corrected image as an output image, where the corrected image is obtained by applying the perspective transformation as a conventional technique to the fisheye image (input image) of FIG. 18A.
Figure 18C:
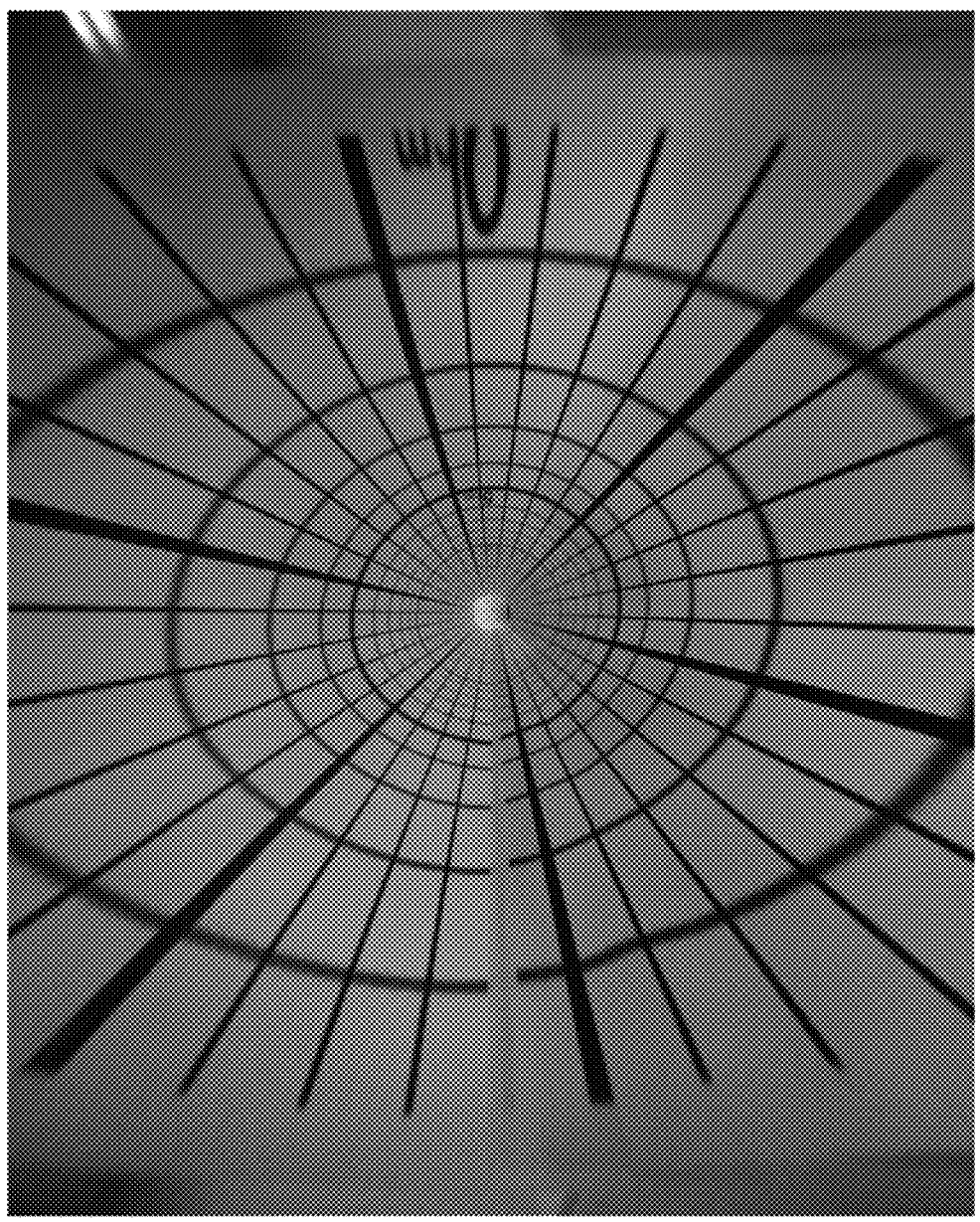
FIG. 18C is a diagram showing an example of a corrected image as an output image, where the corrected image is obtained by applying the operations according to the present invention except for the modification of the correction table to the fisheye image (input image) of FIG. 18A.
Figure 18D:
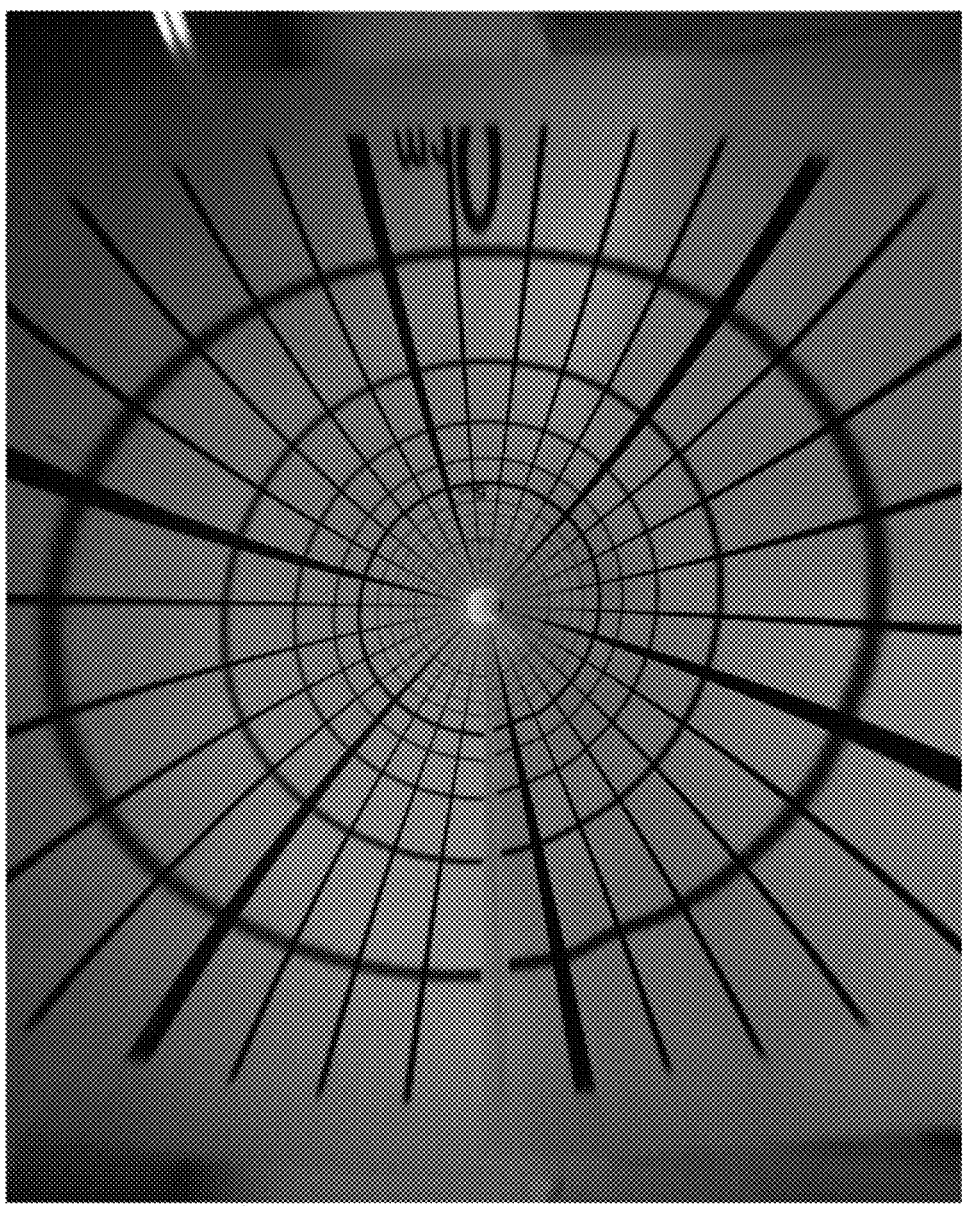
FIG. 18D is a diagram showing an example of a corrected image as an output image, where the corrected image is obtained by applying the operations according to the present invention including the modification of the correction table to the fisheye image (input image) of FIG. 18A.
Figure 19A:
FIG. 19A is a diagram showing an example of a fisheye image as an input image.
Figure 19B:
FIG. 19B is a diagram showing an example of a corrected image as an output image, where the corrected image is obtained by applying the perspective transformation as a conventional technique to the fisheye image (input image) of FIG. 19A.
Figure 19C:
FIG. 19C is a diagram showing an example of a corrected image as an output image, where the corrected image is obtained by applying the operations according to the present invention to the fisheye image (input image) of FIG. 19A.

The correction-table modification unit 27 is provided for mitigating the vertical elongation in the corrected result as shown in FIG. 18C caused by the use of the cylindrical surface as a virtual object and other causes. Specifically, the correction-table modification unit 27 records in the resampling table (correction table) 17 the sets of coordinates (x, y) on the input image corresponding to the sets of coordinates (u, v') in the resampling table (correction table) 17a (which is already generated), in correspondence with the sets of coordinates (u, v). Although the values of u are integers, the values of v' are not necessarily integers. However, the correction-table modification unit 27 can perform the calculation by using a conventional interpolation technique such as linear interpolation with respect to the coordinate v. For example, it is possible to refer to the set of coordinates (x, y) indicated in the resampling table (correction table) 17a in correspondence with each of the set of coordinates (u, v1) and the set of coordinates (u, v2), and perform linear interpolation for each of the coordinates x and y, where the value v1 is the integer obtained by rounding up the value v', and the value v2 is the integer obtained by rounding down the value v'. When the set of coordinates (x, y) corresponding to the set of coordinates (u, v1) is the predetermined set of exceptional coordinates and/or the set of coordinates (x, y) corresponding to the set of coordinates (u, v2) is the predetermined set of exceptional coordinates, the linear interpolation is not performed, and the predetermined set of exceptional coordinates is recorded as a set of coordinates (x, y) corresponding to the set of coordinates (u, v).

The correction amount for use in calculation of the coordinate v' can be calculated by using the equation (4), and the coordinate v' at the position referred to can be calculated by using the equation (5).

$$\Delta v = \beta \cdot w \cdot \left(\frac{v - v_c}{w}\right)^2 \quad (\beta = 0.5) \qquad (4)$$

$$v' = \begin{cases} (v - \Delta v) - v_c + v'_c & \text{if } v - v_c < 0, \\ (v + \Delta v) - v_c + v'_c & \text{otherwise} \end{cases} \qquad (5)$$

The above calculation determines the correspondence between the uv coordinate system for the output image and the uv' coordinate system as illustrated in FIGS. 5A and 5B, where the value $v'_c$ is the value of the v' coordinate (the coordinate in the v'-axis direction) of the center of the intermediate image, and the value $v_c$ is the value of the v coordinate (the coordinate in the v-axis direction) of the center of the output image. Thus, the correspondence between the point $P_1(u, v)$ and the point $P_2(u, v')$ is determined. As understood from the example of FIG. 18C, the necessary amount of the correction increases with the distance from the horizontal center line. That is, the correction amounts required in regions nearer to the upper or lower edge are greater. Therefore, in consideration of this fact, the correction amount in the equation (4) is represented by a quadric function. Alternatively, the correction amount may be calculated by using another function.

As explained above, according to the present embodiment, the correction-table modification unit 27 makes the modification in the v-axis direction. Therefore, the resampling table (correction table) 17a is generated for a larger size than the output image. Specifically, the sufficient number of pixels, for which the resampling table 17a is generated, can be determined by one plus the value of $\Delta v$ obtained by substituting v=0 into the equation (4), wherein digits after a decimal point are rounded up, in order to expand coverage of the resampling table 17a by one pixel for each of upper and lower sides. Thus, data shortage during the operations for modification can be avoided.

Figure 7:
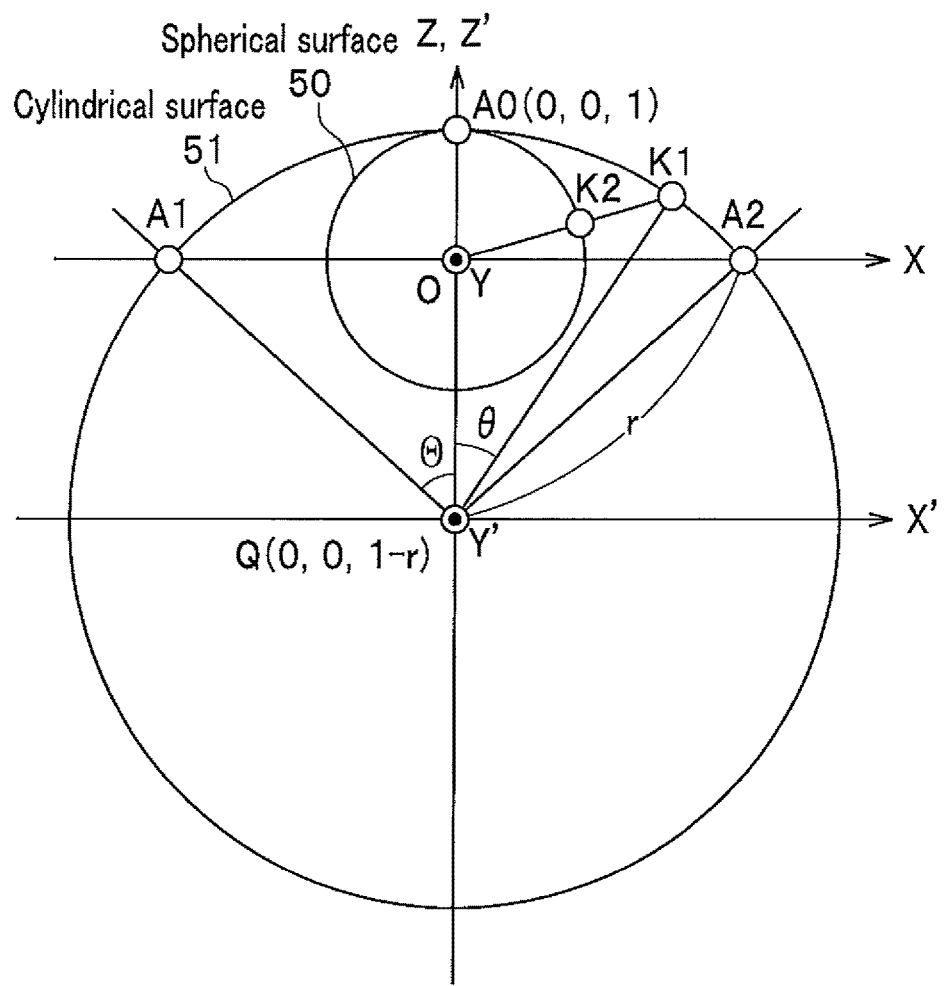
FIG. 7 is a cross-sectional view of the objective space at the cross section in which Y=0 in the XYZ coordinate system, which is presented for explaining the transformation from a receded-position-based light-direction vector to a origin-based light-direction-vector.

Next, the reason why the coordinates are transformed as above by using the equations (1) and (2) is explained below with reference to FIG. 7. FIG. 7 is a cross-sectional view of the objective space at the cross section in which Y=0 in the XYZ coordinate system. The region satisfying Z≥0 of the spherical surface 50 having the center at the origin O and the unit radius corresponds to the input image (fisheye image). The Z-axis corresponds to the optical axis of the fisheye lens at the time of capture of the input image, and the origin O corresponds to the projection center of the fisheye lens at the time of capture of the input image. That is, the origin O corresponds to the aforementioned second projection center according to the present invention.

According to the present embodiment, the position of the point Q at the coordinates (0, 0, 1−r) is determined in such a manner that the spherical surface 50 is in contact with the cylindrical surface 51 at the point A0 with the coordinates (0, 0, 1), where the cylindrical surface 51 has a central axis passing through the point Q and extending parallel to the Y-axis. The radius r of the circle centered at the point Q is obtained by the equations (1). The point Q corresponds to the aforementioned first projection center (i.e., the receded position). The value of Θ is given in advance as a design value, and is, for example, 25 degrees.

Next, the light direction with respect to the point Q is determined on the assumption that the object exists on the cylindrical surface 51. Specifically, the angle θ, on the XZ plane, corresponding to the set of coordinates (u, v') on the intermediate image is determined by using the equations (1), and then the set of coordinates of the point K1 on the cylindrical surface 51 is calculated by using the equations (1). The projection center for the calculation of the set of coordinates of the point K1 is the point Q, and the vector QK1 from the point Q to the point K1 is the receded-position-based light-direction vector.

In the present embodiment, the Y' component of the receded-position-based light-direction vector is obtained by orthogonal projection and scale conversion as indicated in the equations (1). The coefficient in the scale conversion is r·sin Θ, which is the distance between the origin O and the point A2 (or A1). This coefficient is determined such that the representable ranges in the horizontal and vertical directions become identical in the case where the intermediate image (output image) has the shape of a square. However, the coefficient in the scale conversion may be determined in other manners.

Further, the light direction with respect to the origin O is determined. Specifically, the set of coordinates of the point K1 on the cylindrical surface 51 is calculated by using the equations (2), where the projection center is the origin O. The vector OK1 from the origin O to the point K1 is the origin-based light-direction vector. The point K2 is the intersection of the vector OK1 and the spherical surface 50, and the point K1 is in a one-to-one correspondence with the set of coordinates (x, y) on the input image through the point K2.

As explained above, the horizontal angle of view of 180 degrees from the origin O corresponds to the range of view from the point Q extending from the point A1 to the point A2, and therefore corresponds to the horizontal angle of view of 2Θ from the point Q. Therefore, it is possible to mitigate the difference in the angle of view between the representation in the corrected image and observation of the corrected image, and reduce the feeling of strangeness aroused by the corrected image during observation of the corrected image.

The point Q is only required to be located on the rear side of the point O with respect to the direction of the optical axis with which the input image is captured. That is, the location of the point Q is only required to be such that the inner product of the optical-axis direction vector and the direction vector from the second projection center O to the first projection center Q is negative.

In addition, the present embodiment is not limited to the geometric relationship illustrated in FIG. 7. For example, the spherical surface 50 is not necessarily in contact with the cylindrical surface 51 at the point A0, and the radius of the circle corresponding to the cylindrical surface 51 may be increased while the point Q is fixed.

1.5 Basic Operations of Correction-table Generation Device 20

The basic operations of the correction-table generation device 20 are explained below with reference to FIG. 8 (and FIG. 4 for the configuration of the correction-table generation device 20).

Figure 8:
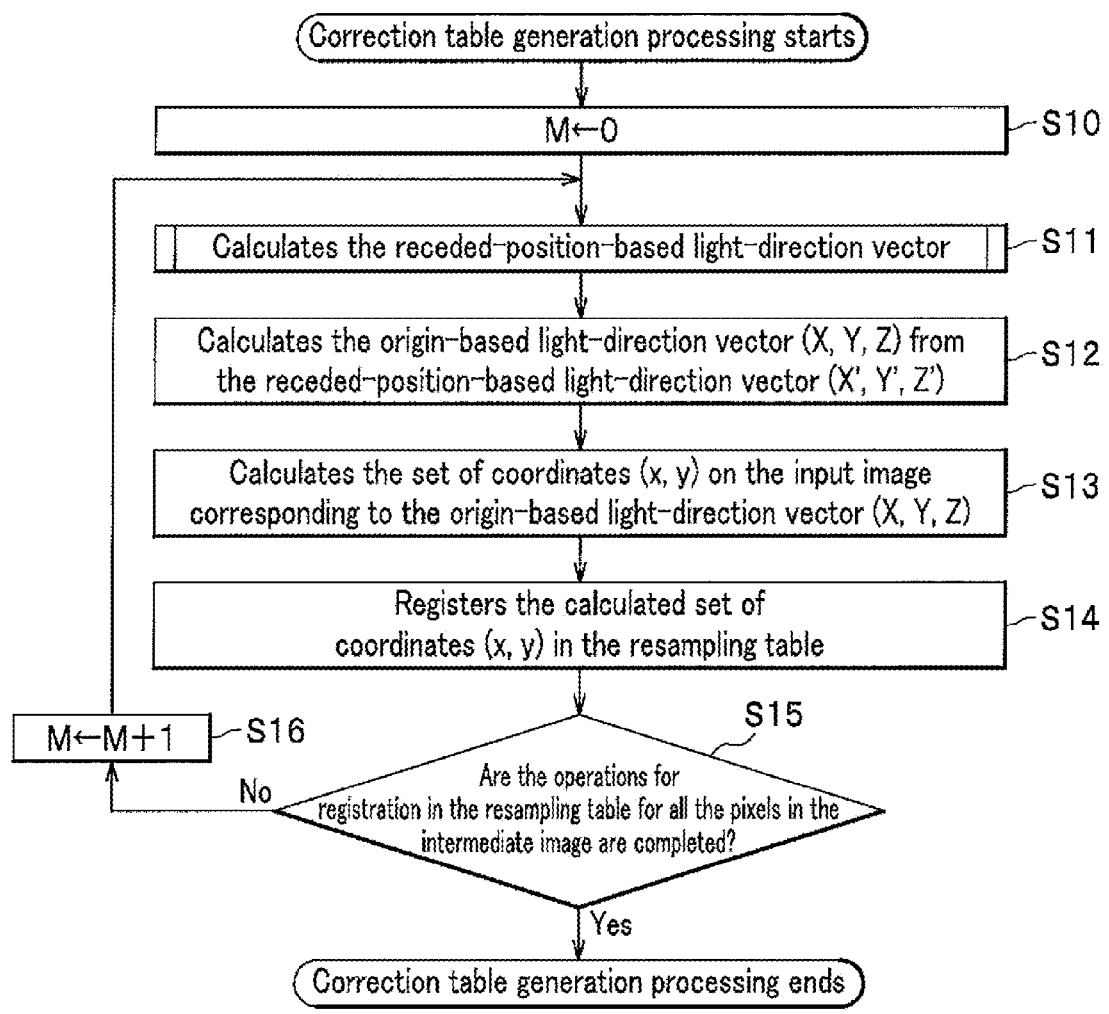
FIG. 8 is a flow diagram showing operations of a correction-table generation device according to the first embodiment of the present invention.

As shown in FIG. 8, in step S10, the correction-table generation device 20 sets the count M of a counter to "0". In step S11, the correction-table generation device 20 performs processing for calculating the receded-position-based light-direction vector as explained in detail later with reference to FIG. 9. In step S12, the origin-based light-direction calculation unit 24 calculates the origin-based light-direction vector OK1(X, Y, Z) from the receded-position-based light-direction vector QK1(X', Y', Z').

In step S13, the resampling-position calculation unit 25 calculates the set of coordinates (x, y) on the input image corresponding to the origin-based light-direction vector OK1 (X, Y, Z). In step S14, the resampling-position recording unit 26 records the calculated set of coordinates (x, y) in the resampling table (correction table) 17a in correspondence with the set of coordinates (u, v') on the intermediate image.

In step S15, the correction-table generation device 20 determines whether or not the operations for recording in the resampling table (correction table) 17a for all the pixels in the intermediate image are completed, for example, by comparing the count M of the counter with the number of the pixels in the intermediate image. When yes is determined in step S15, the correction-table generation device 20 completes the processing for generating the correction table. When no is determined in step S15, the correction-table generation device 20 increments the count M of the counter by one in step S16, and the operation goes to step S11.

1.6 Calculation of Receded-position-based Light-direction Vector

The processing for calculating the receded-position-based light-direction vector in step S11 in FIG. 8 is explained below with reference to FIG. 9.

Figure 9:
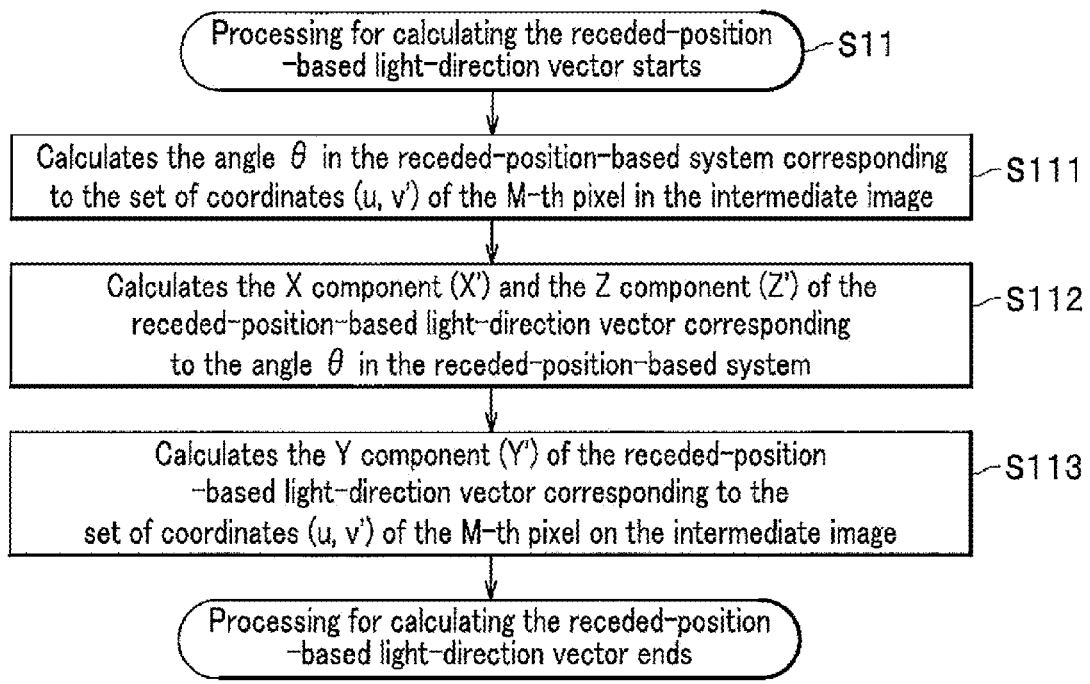
FIG. 9 is a flow diagram showing operations of a receded-position-based light-direction vector calculation unit in the correction-table generation device according to the first embodiment of the present invention.

As shown in FIG. 9, in step S111, the receded-position-based light-direction calculation unit 23 calculates as the set of coordinates (u, v') of the M-th pixel in the intermediate image the remainder u and the quotient v' obtained by division of the count M of the counter by the number of pixels arrayed in the u-axis direction in the intermediate image. (That is, when the number of pixels in the u-axis direction is B, M=v'·B+u.) Then, the receded-position-based light-direction calculation unit 23 calculates the angle θ in the receded-position-based system corresponding to the set of coordinates (u, v') on the intermediate image, by using the equations (1).

In step S112, the receded-position-based light-direction calculation unit 23 calculates the X component (X') and the Z component (Z') of the receded-position-based light-direction vector corresponding to the angle θ by using the equations (1).

In step S113, the receded-position-based light-direction calculation unit 23 calculates the Y component (Y') of the receded-position-based light-direction vector corresponding to the set of coordinates (u, v') of the M-th pixel on the intermediate image by using the equations (1). Thereafter, the processing for calculating the receded-position-based light-direction vector is completed.

1.7 Processing of Modification of Correction Table

The processing of modification of the correction table is explained below with reference to FIG. 10. When a correction of the resampling table (correction table) 17a is necessary after the basic operations of the correction-table generation device 20 explained before are completed, the processing of correction of the correction table is performed.

Figure 10:
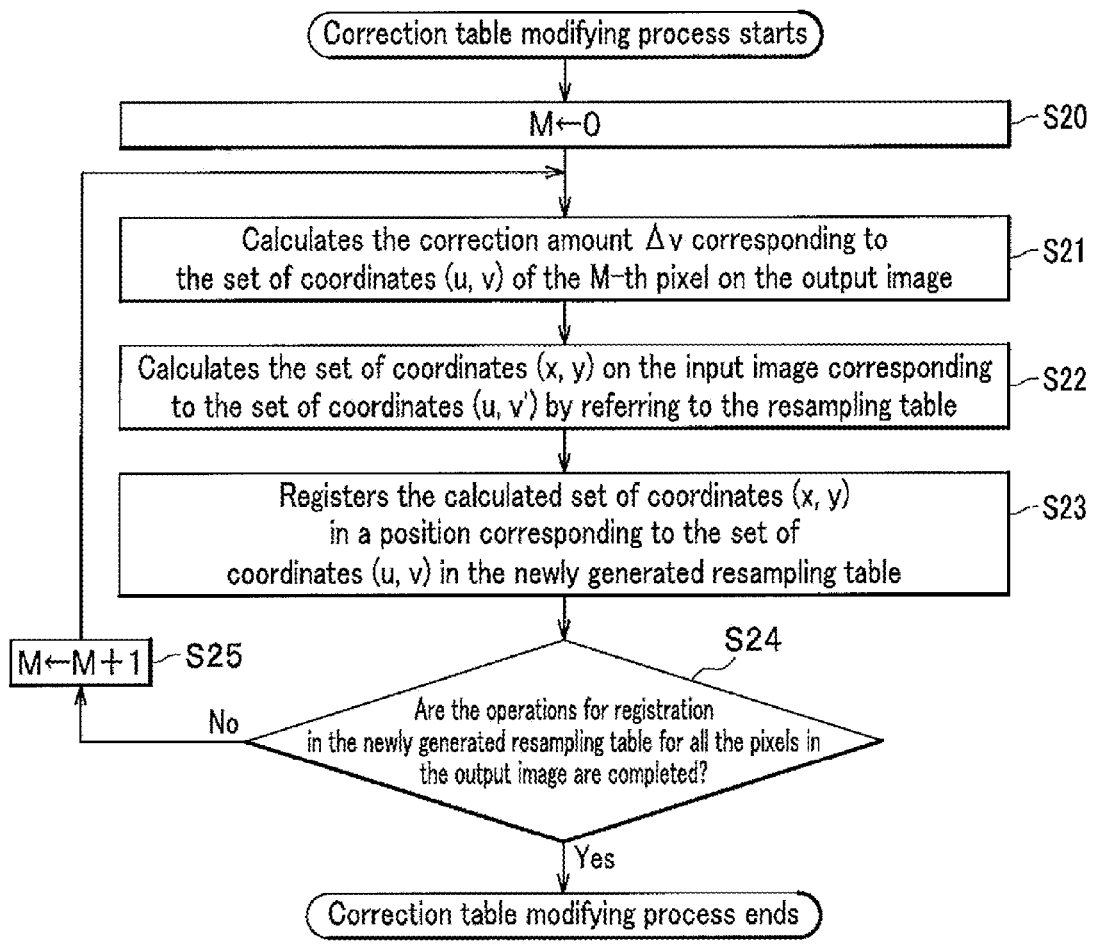
FIG. 10 is a flow diagram showing operations of a correction-table modification unit in the correction-table generation device according to the first embodiment of the present invention.

As shown in FIG. 10, in step S20, the correction-table modification unit 27 sets the count M of a counter to "0". Then, in step S21, the correction-table modification unit 27 calculates the correction amount Δv corresponding to the set of coordinates (u, v) of the M-th pixel on the output image by using the equation (4). The manner of calculating the set of coordinates (u, v) of the M-th pixel on the output image from the count M of the counter is similar to the manner explained at step S111 in FIG. 9.

In step S22, the correction-table modification unit 27 refers to the resampling table (correction table) 17a, and calculates the set of coordinates (x, y) on the input image corresponding to the set of coordinates (u, v'). The value of v' corresponding to the value of v is obtained by the equations (5).

In step S23, the correction-table modification unit 27 records the calculated set of coordinates (x, y) in a position corresponding to the set of coordinates (u, v) in the resampling table (correction table) 17.

Since the operations in steps S24 and S25 are similar to the operations in steps S15 and S16, the explanations on steps S24 and S25 are omitted.

The above operations according to the first embodiment suppress the steep curving of the images of horizontal straight objects at specific areas of the corrected image, and mitigate the difference in the angle of view between the representation in the corrected image and observation of the corrected image. Therefore, the feeling of strangeness aroused by the corrected image during observation of the corrected image can be reduced.

2. Second Embodiment

The second embodiment of the present invention is explained below with reference to the FIGS. 11 to 17.

2.1 Configuration of Correction-table Generation Device 20A

Figure 11:
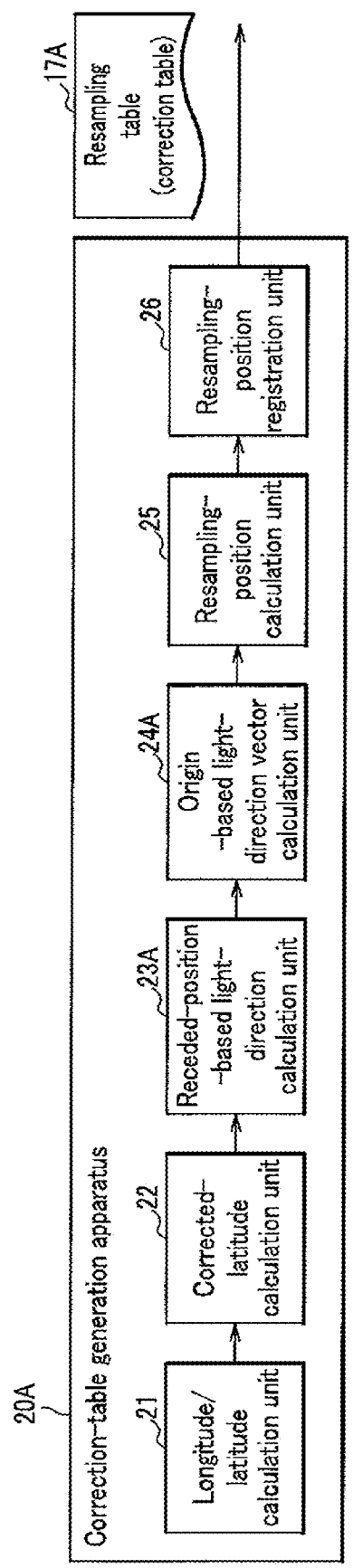
FIG. 11 is a block diagram showing a configuration of a correction-table generation device according to a second embodiment of the present invention.

The configuration of the correction-table generation device 20A according to the second embodiment is explained below with reference to FIG. 11. As illustrated in FIG. 11, the correction-table generation device 20A according to the second embodiment is different from the correction-table generation device 20 according to the first embodiment in that the correction-table generation device 20A does not have the correction-table modification unit 27, and includes a longitude/latitude calculation unit 21, a corrected-latitude calculation unit 22, a receded-position-based light-direction vector calculation unit 23A, and an origin-based light-direction vector calculation unit 24A. In the second embodiment, the elements identical to the corresponding elements in the first embodiment are referred to by the identical reference numbers to the first embodiment, and the same explanations as the first embodiment are not repeated.

The longitude/latitude calculation unit 21 calculates a set of the longitude $\lambda$ and the latitude $\Phi$ corresponding to the set of coordinates (u, v) on the output image. For example, the longitude/latitude calculation unit 21 calculates the longitude $\lambda$ and the latitude $\Phi$ by using the Mercator projection, which is one of non-perspective cylindrical projections among map projections used for production of a world map. In the second embodiment, a coordinate of the pixels at the left end of the output image corresponds to the longitude $-\Theta$, and a coordinate of the pixels at the right end of the output image corresponds to the longitude $\Theta$. The value of the longitude $\Theta$ is a design value corresponding to the half angle of view as illustrated in FIG. 7, and is, for example, 80 degrees. The longitude/latitude calculation unit 21 calculates the longitude $\lambda$ and the latitude $\Phi$ by using the equations (6), in which a constant w for normalizing the scale in the u-axis direction is used.

$$\begin{cases} \lambda = \dfrac{u - u_c}{w} \cdot \Theta \\ \Phi = 2\tan^{-1}\left\{\exp\left(\dfrac{v - v_c}{w} \cdot \dfrac{\pi}{2}\right)\right\} - \dfrac{\pi}{2} \end{cases} \quad (6)$$

The above calculation realizes a coordinate transformation from the uv coordinate system of the output image to the longitude-latitude coordinate system, and the point $P_1(u, v)$ on the output image is converted to the point $P_2(\lambda, \Phi)$ on the longitude-latitude plane as illustrated in FIGS. 12A and 12B. Herein, $(u_c, v_c)$ is the set of coordinates of the center position O' of the output image. For example, in the case where the output image has 640 pixels in the u-axis direction, the value of $u_c$ is calculated to be (0+639)/2=319.5. The value of $v_c$ can also be calculated in a similar manner. The constant w for normalizing the scale in the u-axis direction is set equal to the value of $u_c$. In order to secure the consistency in the scale of the entire output image, the constant w is also used for normalizing the scale in the v-axis direction.

The corrected-latitude calculation unit 22 calculates a corrected latitude $\phi$ from an input longitude $\lambda$ and latitude $\Phi$, for example, by using the equations (7). The corrected latitude $\phi$ is used as the latitude in calculation of the receded-position-based light-direction vector.

$$\begin{cases} \phi = \tan^{-1}\{\tan(\Phi) \cdot f(\lambda)\} \\ \text{where } f(\lambda) = \alpha + (1 - \alpha)\cos\lambda \ (\alpha = 0.4) \end{cases} \quad (7)$$

The above calculation realizes a correction in the latitude direction in the longitude-latitude coordinate system as illustrated in FIG. 12B, so that the point $P_2(\lambda, \Phi)$ is converted to the point $P_3(\lambda, \phi)$. The reason why the latitude is corrected as above will be explained later.

The receded-position-based light-direction vector calculation unit 23A calculates as the receded-position-based light-direction vector QK0(X', Y', Z') a light-direction vector in the objective space corresponding to the longitude X and the corrected latitude $\phi$, for example, by using the equations (8). The receded-position-based light-direction vector QK0(X', Y', Z') will be explained later.

$$\begin{cases} X' = \sin\lambda \cdot \cos\phi \\ Y' = \sin\phi \\ Z' = \cos\lambda \cdot \cos\phi \end{cases} \quad (8)$$

Figure 13A:
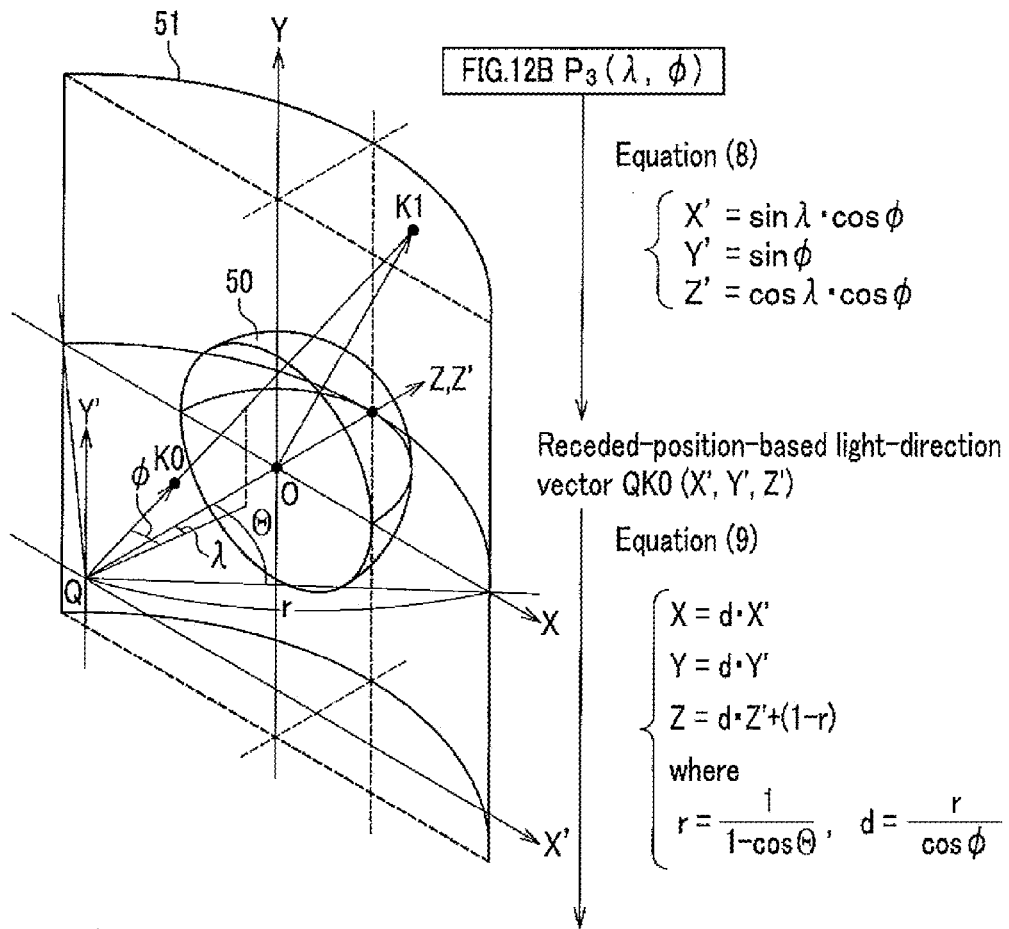
FIGS. 13A and 13B are diagrams showing a transformation from the set of coordinates in the longitude-latitude coordinate system to the receded-position-based light-direction vector, a transformation from the receded-position-based light-direction vector to an origin-based light-direction vector, and a transformation from the origin-based light-direction vector to a set of coordinates of each pixel in an input image.
Figure 13B:
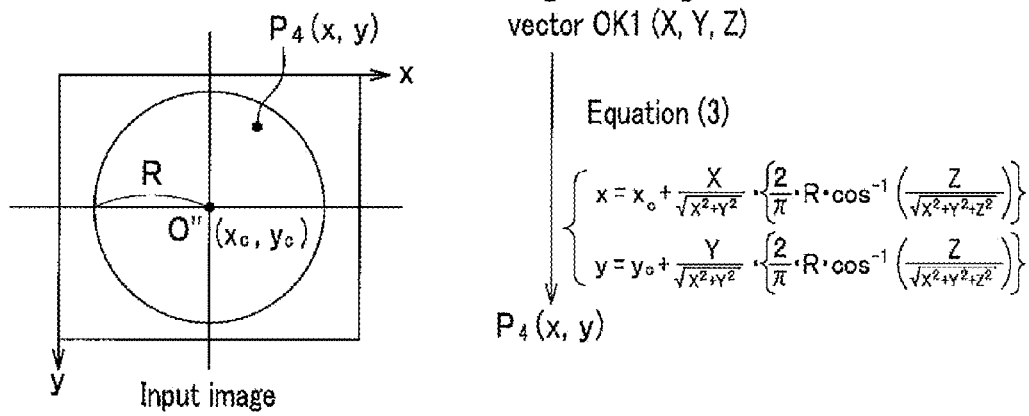

The above calculation realizes a transformation from the longitude-latitude coordinate system illustrated in FIG. 12B to the X'Y'Z' coordinate system illustrated in FIG. 13A. The X'Y'Z' coordinate system is a coordinate system of the objective space. As in the first embodiment, the Z'-axis (or the Z-axis) corresponds to the optical axis with which the input image is captured. In addition, the origin O corresponds to the projection center with which the input image is captured, and corresponds to the aforementioned second projection center according to the present invention. Further, the point Q corresponding to the aforementioned first projection center according to the present invention (i.e., the receded position) is located on the rear side of the origin O along the optical axis. The receded-position-based light-direction vector QK0 (X', Y', Z') is a direction vector directed from the point Q to the point at the longitude $\lambda$ and the corrected latitude $\phi$ and normalized to the unit length. As shown in FIGS. 12A and 12B and the equations (6), the longitude $\lambda$ can vary in the range from $-\Theta$ to $\Theta$ (i.e., $-\Theta \leq \lambda \leq \Theta$). Thus, the point $P_3(\lambda, \phi)$ on the longitude-latitude coordinate system is converted to the receded-position-based light-direction vector QK0(X', Y', Z') by the above transformation.

The origin-based light-direction vector calculation unit 24A calculates the origin-based light-direction vector OK1 (X, Y, Z) by using the equations (9).

$$\begin{cases} X = d \cdot X' \\ Y = d \cdot Y' \\ Z = d \cdot Z' + (1-r) \\ \text{where } r = 1/(1 - \cos\Theta) \text{ and } d = r/\cos\phi \end{cases} \quad (9)$$

The above calculation realizes a transformation from the X'Y'Z' coordinate system to the XYZ coordinate system as illustrated in FIG. 13A, and the receded-position-based light-direction vector QK0(X', Y', Z') is converted to the origin-based light-direction vector OK1(X, Y, Z). The origin-based light-direction vector OK1(X, Y, Z) is a vector from the origin O to the point K1, at which a half-line extending from the point Q in the direction of the receded-position-based light-direction vector QK0(X', Y', Z') intersects with the cylindrical surface 51.

Since the resampling-position calculation unit 25 and the resampling-position recording unit 26 in the first and second embodiments are similar, explanations on the resampling-position calculation unit 25 and the resampling-position recording unit 26 are omitted.

The reason why the latitude Φ is corrected to the corrected latitude ϕ by the corrected-latitude calculation unit 22 is explained below with reference to FIGS. 14 and 15.

Figure 14:
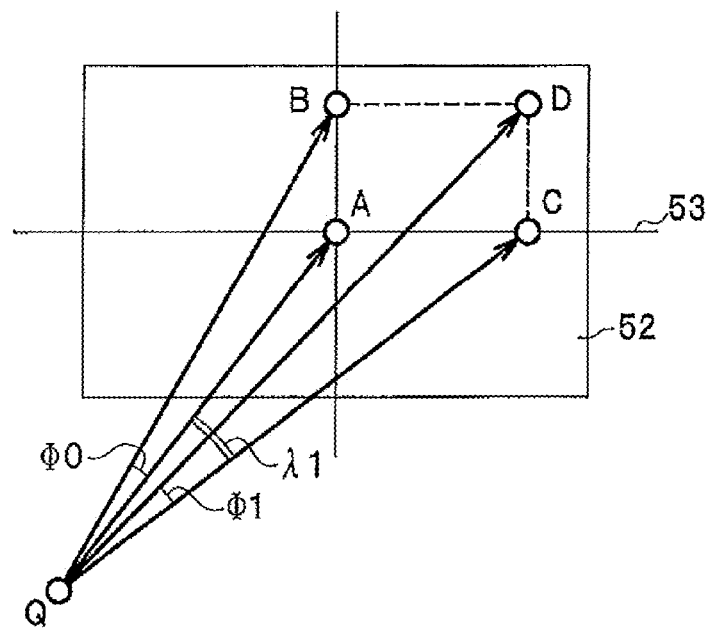
FIG. 14 is a diagram for illustrating examples of straight lines in the objective space projected to straight images on an output image, and an example of a straight line projected to a curved image on the output image, according to the second embodiment of the present invention.
Figure 15:
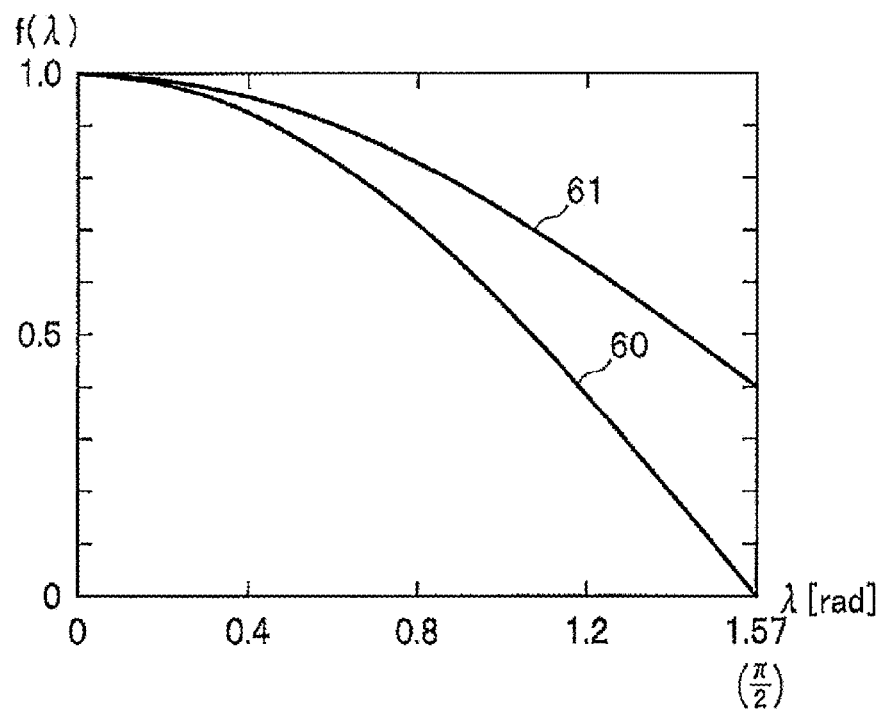
FIG. 15 is a diagram for illustrating an example of functions used in the correction of the latitude made by a corrected-latitude calculation unit according to the second embodiment.

In FIG. 14, the point Q is the aforementioned first projection center, and the point A is a point at the longitude of zero degrees and the latitude of zero degrees on a unit spherical surface centered at the point Q. The plane 52 is a plane perpendicular to the vector QA in the objective space, the straight line 53 is an intersecting line of the plane 52 and a plane containing the triangle QAC (i.e., the XZ plane), and the rectangle ABDC is contained in the plane 52.

Mercator projection is a projection that projects a spherical surface onto a plane, wherein both a semicircle of equal longitude and a circle of equal latitude on the spherical surface become straight lines on the plane. Accordingly, the straight lines AB, AC, and CD in the objective space illustrated in FIG. 14 are projected onto straight lines without curvature on the longitude-latitude plane because the straight lines AB and CD become semicircles of equal longitude on the unit spherical surface centered at the point Q, and the straight line AC becomes a semicircle of equal latitude of zero degree on the unit spherical surface. On the other hand, the length of segment QC is '1/cos(λ1)' compared with the length of segment QA, and accordingly, angle Φ0 of ∠AQB, which is the latitude of point B, and angle Φ1 of ∠CQD, which is the latitude of point D, are in a relationship of 'tan (Φ1)=tan(Φ0)·cos(λ1)' therebetween. That is, line BD does not become a semicircle of equal latitude on the unit spherical surface, and accordingly, when the straight line BD is represented by Mercator projection, the line BD does not become a straight line but becomes a curved line on the plane onto which the line BD is projected (i.e., the longitude-latitude plane).

In order to reduce the curvature of the straight line BD on the longitude-latitude plane, for example, the equations (7) are used. If the formula of f(λ) in the equations (7) is changed to f(λ)=cos(λ), the curvature of the straight line BD is completely removed. However, when the latitude Φ is corrected with f(λ)=cos(λ), and λ=90 degrees is inputted into the corrected-latitude calculation unit 22, the corrected latitude ϕ becomes zero regardless of the latitude Φ. This means that the scale of enlargement in the vertical direction extremely increases in the vicinities of the left and right edges of the output image. Therefore, the use of f(λ)=cos(λ) is undesirable for users to observe the output image.

Thus, for example, the approximation f(λ)=0.4+0.6 cos(λ), instead of f(λ)=cos(λ), is used in the equations (7). FIG. 15 is a graph illustrating the curve 60 of f(λ)=cos(λ) and the curve 61 of f(λ)=0.4+0.6 cos(λ) in the range of 0≤λ≤π/2. It is desirable that the curve of f(λ) used in the correction of the latitude Φ be close to the curve 60 in the range in which the absolute value of λ is small (corresponding to the central region of the output image), because the curvature of the images of straight objects is well corrected when the curve of f(λ) is close to the curve 60. However, since the scale of enlargement in the vertical direction increases when the value of f(λ) approaches zero, it is desirable to design f(λ) so that the minimum of f(λ) not fall below a certain amount.

Specifically, the function f(λ) in the equations (7) is designed to satisfy the following conditions. As long as the following conditions are satisfied, the function f(λ) in the equations (7) may be another function.

The first condition is that f(λ)≤1. The first condition is imposed for ensuring that the correction of the latitude is not performed in a wrong direction at any value of λ in the entire domain.

The second condition is 'a certain Λ exists that satisfies f(Λ)<1', wherein Λ is a value included in the domain of λ. This condition guarantees correction toward a right direction for at least one of λ.

The third condition is that cos(λ)≤f(λ). The third condition is imposed for ensuring that the correction of the latitude is not performed too much at any value of λ in the entire domain.

The fourth condition is that f(λ)/cos(λ) is a monotonously non-decreasing function. The fourth condition is imposed for making the degree of correction of the latitude gradually decrease with the value of λ without undulation.

The fifth condition is that f(λ)≥G, where G is a given constant satisfying 0<G<1. The fifth condition is imposed for maintaining the scale of enlargement in the vertical direction in the entire output image within a predetermined range. It is possible to determine the value of the constant G in advance according to the allowable scale of enlargement in the vertical direction and the allowable degree of curvature of lines in the horizontal direction. When the constant G is great, the degree of the correction of the curvature of the lines in the horizontal direction is lowered although the scale of enlargement in the vertical direction can be suppressed. On the other hand, when the constant G is small, the scale of enlargement in the vertical direction can increase although the degree of the correction of the curvature of the lines in the horizontal direction becomes great. In consideration of the above nature, it is preferable that the constant G be in the range from approximately 0.2 to 0.5.

2.2 Operations of Correction-table Generation Device 20A

The operations of the correction-table generation device 20A are explained below with reference to FIG. 16 (and FIG. 11 for the configuration of the correction-table generation device 20A).

Figure 16:
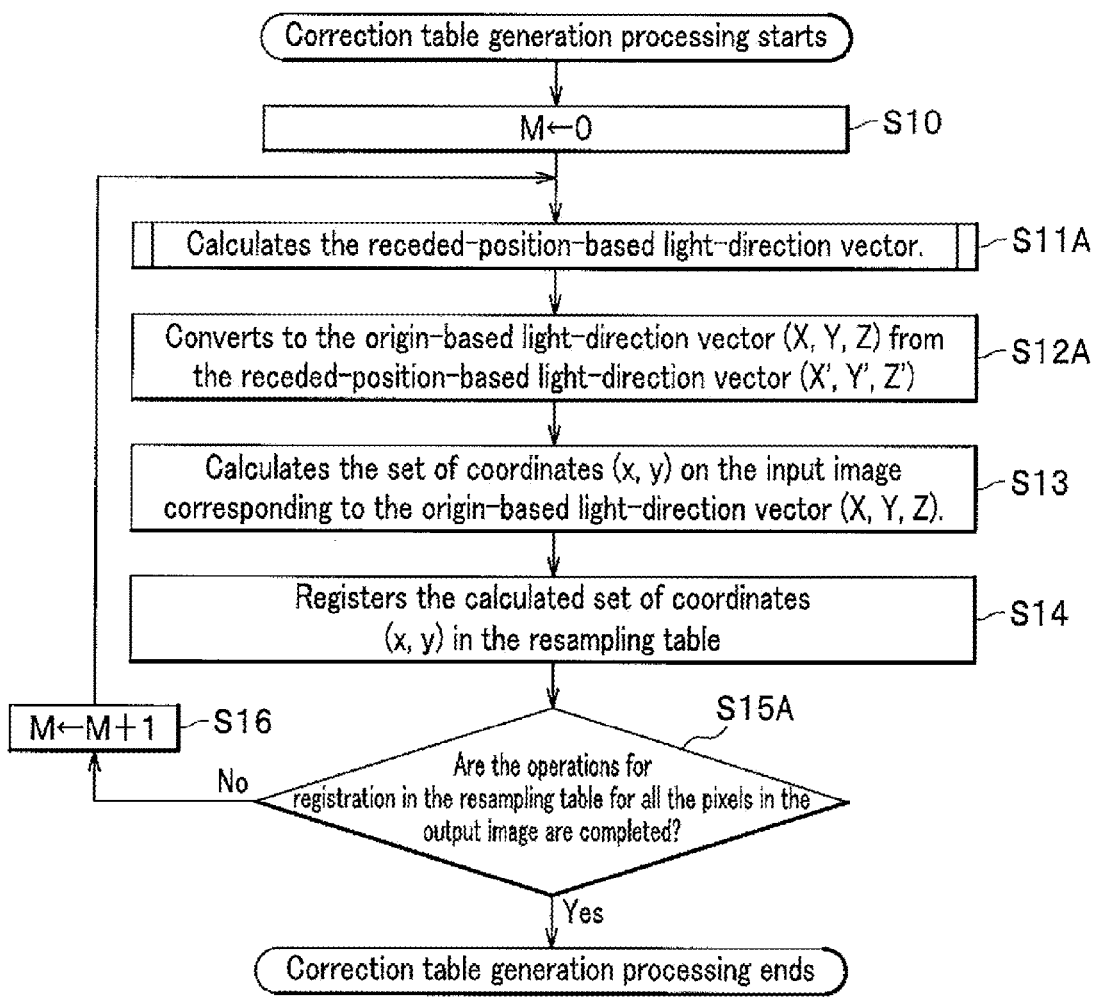
FIG. 16 is a flow diagram showing operations of a correction-table generation device according to a second embodiment of the present invention.

As shown in FIG. 16, in step S10, the correction-table generation device 20A sets the count M of a counter to "0". Then, in step S11A, the correction-table generation device 20A performs processing for calculating the receded-position-based light-direction vector. Details of the processing for calculating the receded-position-based light-direction vector will be explained later with reference to FIG. 17. Thereafter, in step S12A, the origin-based light-direction vector calculation unit 24A converts the receded-position-based light-direction vector QK0(X', Y', Z') to the origin-based light-direction vector OK1(X, Y, Z) by using the equations (9).

Since the operations in steps S13 and S14 in FIG. 16 are similar to the operations in the corresponding steps in the first embodiment, the explanations on steps S13 and S14 are omitted.

In step S15A, the correction-table generation device 20A determines whether or not the recording in the resampling table (correction table) 17A is completed for all the pixels in the output image, for example, by comparing the count M of the counter with the number of the pixels in the output image. When yes is determined in step S15A, the correction-table generation device 20A completes the processing for producing the correction table.

On the other hand, when no is determined in step S15A, i.e., when the recording in the resampling table (correction table) 17A for at least one pixel in the output image is not yet completed, the correction-table generation device 20A increments the count M of the counter by one in step S16, and then the operation goes to step S11A.

2.3 Operations of Receded-position-based Light-direction Vector

The processing for calculating the receded-position-based light-direction vector in step S11A in FIG. 16 is explained below with reference to FIG. 17.

Figure 17:
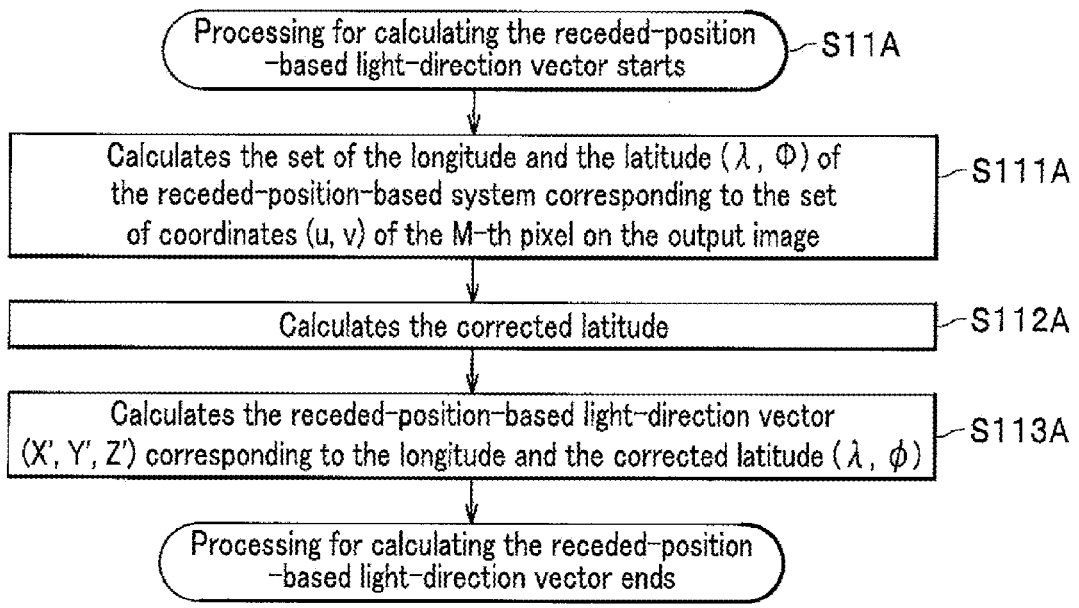
FIG. 17 is a flow diagram showing operations of a receded-position-based light-direction vector calculation unit in the correction-table generation device according to the second embodiment of the present invention.

As shown in FIG. 17, in step S111A, the longitude/latitude calculation unit 21 calculates the set of the longitude and the latitude ($\lambda,\Phi$) corresponding to the set of coordinates (u, v) of the M-th pixel on the output image, by using the equations (6). The manner of calculating the set of coordinates (u, v) of the M-th pixel on the output image from the count M of the counter in the processing of FIG. 17 is similar to the manner explained at step S111 in FIG. 9. Then, in step S112A, the corrected-latitude calculation unit 22 performs the processing for calculating the corrected latitude by using the equations (7). Subsequently, in step S113A, the receded-position-based light-direction vector calculation unit 23A calculates the receded-position-based light-direction vector QK0(X', Y', Z'), based on the longitude $\lambda$ (calculated by the longitude/latitude calculation unit 21) and the corrected latitude $\phi$ (calculated by the corrected-latitude calculation unit 22) by using the equations (8).

As explained above, even in the case where the receded-position-based light-direction vector is calculated in the manner different from the first embodiment, it is possible to suppress the steep curving of the images of horizontal straight objects at specific areas of the corrected image, and mitigate the difference in the angle of view between the representation in the corrected image and observation of the corrected image. Therefore, the feeling of strangeness aroused by the corrected image during observation of the corrected image can be reduced.

3. Variations

The present invention is not limited to the first and second embodiments explained above, and the first and second embodiments may be modified, for example, as follows.

(1) The image generation device 30 is not limited to the aforementioned digital video camera having a circular fisheye lens based on the equidistance projection method with the horizontal and vertical angles of view of 180 degrees. For example, the image generation device 30 may be one of various devices including digital cameras having a wide angle lens, digital cameras having a fisheye lens designed based on one of various projection methods such as the equidistance projection method, video cameras having a wide angle lens or a fisheye lens, and image playback devices which play back images captured by the above digital cameras or video cameras and stored in a storage medium. It is possible to cope with the change in the projection method used in capturing the input image by adaptation of the equations (3) for the changed projection method, and such adaptation is not difficult.

(2) The device connected to the image output unit 14 is not limited to the image display device 40, and can be variously changed according to the application of the present invention. For example, the device connected to the image output unit 14 may be a storage device which stores the corrected image, or a transmission device which transfers the corrected image to another system.

(3) In the explained embodiments, the pixels in the output image or the intermediate image are referred to in the order of the raster scan, and therefore the set of coordinates of each pixel is calculated from the count of the counter, for example, by obtaining as the coordinate u and the coordinate v or v' the remainder and the quotient in the division of the count N or M of the counter by the number of the pixels arrayed in the u-axis direction. However, the order in which the pixels in the output image or the intermediate image are referred to is not limited to the order of the raster scan.

(4) The correction table 17 is not limited to a resampling table. For example, in a case where the image correction device 10 is configured to perform correction such that the geometric correction unit 13 performs correction while calculating coordinates (x, y) on the input image that correspond to pixel coordinates (u, v) on the output image each time, parameters related to the input image and parameters related to the output image can be stored in the correction-table storage 15 as the correction table 17. In this case, the storage capacity of the correction-table storage 15 may be smaller compared with a case of using a resampling table as the correction table 17.

In a case of such arrangement, as a method of obtaining coordinates on the input image that correspond to pixel coordinates on the output image, the geometric correction unit 13 may be configured to execute the flows shown in FIGS. 8 to 10 or the flows in FIGS. 16 and 17 as they are (However, it is not necessary to register calculated coordinates (x, y) into the resampling table (step S14), and pixel values of the output image can be instantly determined, based on the calculated coordinates (x, y).), or, the geometric correction unit 13 may be configured to use a composite function, which is prepared in advance, such as to be able to directly calculate coordinates (x, y) on the input image that correspond to pixel coordinates (u, v) on the output image from the coordinates (u, v). Further, the correction-table update unit 16 may be configured to include a data input device, such as a keyboard, to enable a user to change parameters related to the output image.

(5) Although the first and second embodiments are explained on the assumption that the horizontal and vertical directions of the fisheye image are respectively identical to the horizontal and vertical directions of the output image, the present invention is not limited to such an assumption. For example, in the case where a fisheye camera having a three-axis acceleration sensor is used, it is possible to configure the image correction device to obtain from the fisheye camera information on the direction of gravity in the objective space, and produce a resampling table in such a manner that the vertical direction of the output image coincides with the direction of gravity. The above modification can be easily made by simply rotating the orientation of the coordinate system by use of a conventional technique when the arrangement of the fisheye image with respect to the ground surface is determined.

(6) The manner of calculation of the receded-position-based light-direction vector is not limited to the manners indicated as examples in the explanations on the first and second embodiments, and can be variously modified. In addition, the range of the longitude represented in the output image is not limited to the range from −90 degrees to 90 degrees.

(7) In the explanations on the first and second embodiments, it is assumed that the pixel value of each pixel in the input image is constituted by one of the 256 integer (digitized) values in the range of 0 to 255 (represented by 8 bits) for each of the primary colors (the three primary colors R, G; and B in the embodiments). However, the type of the pixel value handled by the image correction device according to the present invention is not limited to the example assumed in the explanations on the first and second embodiments. For example, the input image may have a gradation different from the above explanations, e.g., the pixel value of each pixel in the input image may be constituted by one of the 1024 integer (digitized) values in the range of 0 to 1023 (represented by 10 bits) for each of the primary colors. Even in the case where the gradation of the input image is different from the output image, it is possible to easily cope with the difference by using a conventional technique.

Further, even in the case where each pixel is represented by a greater number of primary colors, e.g., the five primary colors of R, G, B, C (Cyan), and Y (Yellow), it is possible to easily cope with the greater number of primary colors by use of a conventional technique.

(8) The correction-table storage 15 may be realized by use of a storage medium which is detachable (removable) from the image correction device 10. For example, the storage medium may be an SD (Secure Digital) memory card. In the case where the correction-table storage 15 is realized by an SD memory card or the like, it is possible to configure the correction-table generation device 20 to have an SD-memory-card writer or the like and record the resampling table (correction table) 17 produced by the correction-table generation device 20 in the correction-table storage 15 through the SD-memory-card writer or the like. In the case where the correction-table generation device 20 is configured as above, the correction-table update unit 16 in the image correction device 10 can be dispensed with. Therefore, the above configuration of the correction-table generation device 20 for use of the SD memory card or the like is preferable in the case where the update frequency of the correction table 17 is low.

(9) In the first and second embodiments explained above, the origin-based light-direction vector is calculated from the receded-position-based light-direction vector through the cylindrical surface 51. However, the manner of calculation of the origin-based light-direction vector is not limited to the explained manner. For example, the origin-based light-direction vector can be calculated through such a curved surface other than the cylindrical surface that both of the aforementioned first projection center Q and the aforementioned second projection center O are located on the same side of the curved surface. For example, the origin-based light-direction vector can be calculated through an elliptic cylindrical surface which has an axis passing through the first projection center. In addition, in the case where the range of longitudes represented in the output image is less than 180 degrees, the origin-based light-direction vector can be calculated through a plane perpendicular to the Z-axis. Further, in the case where the allowable degree of curvature of lines in the output image is great, the origin-based light-direction vector can be calculated through such a curved surface other than a cylindrical surface that the first projection center is located on the concave side of the curved surface.

The specification and drawings are, accordingly, to be regarded in an illustrative rather than a restrictive sense. It will, however, be evident that various modifications and changes may be made thereto without departing from the spirit and scope of the invention(s) as set forth in the claims.

What is claimed is:

1. A correction-table generation device which generates a correction table to be used in generation of a corrected image by geometric correction of an input image, comprising:
    a receded-position-based light-direction vector obtaining unit which obtains a light-direction vector in an objective space corresponding to each pixel position on the corrected image, based on a first projection center which is located on a rear side of a second projection center with respect to a direction of an optical axis associated with the input image, where the second projection center is a projection center of the input image in the objective space;
    an origin-based light-direction vector obtaining unit which obtains an origin-based light-direction vector from the light-direction vector, where the origin-based light-direction vector is a vector indicating a direction from the second projection center in which a point corresponding to said each pixel position exists in the objective space;
    a resampling-position obtaining unit which obtains as a resampling position a position on the input image corresponding to the origin-based light-direction vector; and
    a resampling-position recording unit which records in the correction table the resampling position in correspondence with said each pixel position in the corrected image.

2. An image correction device which generates a corrected image by geometric correction of an input image, comprising:
    an image input unit which receives the input image;
    an image storage unit which stores the input image;
    a correction-table storage unit which stores a correction table for use in the geometric correction of the input image;
    a geometric correction unit which geometrically corrects the input image stored in the image storage unit, based on the correction table;
    an image output unit which outputs as the corrected image the input image geometrically corrected by the geometric correction unit;
    wherein the correction table is generated by obtaining a light-direction vector in an objective space corresponding to each pixel position on the corrected image, based on a first projection center which is located on a rear side of a second projection center as a projection center of the input image in the objective space with respect to a direction of an optical axis associated with the input image, obtaining from the light-direction vector an origin-based light-direction vector indicating a direction from the second projection center in which a point corresponding to said each pixel position exists in the objective space, obtaining as a resampling position a position on the input image corresponding to the origin-based light-direction vector, and recording in the correction table the resampling position in correspondence with said each pixel position in the corrected image.

3. An image correction device which generates a corrected image by geometric correction of an input image, comprising:
    an image input unit which receives the input image;
    an image storage unit which stores the input image;
    a geometric correction unit which obtains a light-direction vector in an objective space corresponding to each pixel position on the corrected image, based on a first projection center which is located on a rear side of a second projection center as a projection center of the input image in the objective space with respect to a direction of an optical axis associated with the input image, obtains from the light-direction vector an origin-based light-direction vector indicating a direction from the second projection center in which a point corresponding to said each pixel position exists in the objective space, obtains as a resampling position a position on the input image corresponding to the origin-based light-direction vector, and determines a pixel value of each pixel of the corrected image, based on the resampling position and the input image stored in the image storage unit; and an image output unit which outputs the corrected image in which the pixel value of each pixel is determined by the geometric correction unit.

4. A correction-table generation method to be executed by a processor in a correction-table generation device which generates a correction table to be used in generation of a corrected image by geometric correction of an input image, comprising:

a step of obtaining, by the processor, a light-direction vector in an objective space corresponding to each pixel position on the corrected image, based on a first projection center which is located on a rear side of a second projection center with respect to a direction of an optical axis associated with the input image, where the second projection center is a projection center of the input image in the objective space;

a step of obtaining, by the processor, an origin-based light-direction vector from the light-direction vector, where the origin-based light-direction vector is a vector indicating a direction from the second projection center in which a point corresponding to said each pixel position exists in the objective space;

a step of obtaining, by the processor, a position on the input image corresponding to the origin-based light-direction vector as a resampling position; and a step of recording, by the processor, the resampling position in correspondence with said each pixel position in the corrected image.

5. An image correction method to be executed by a processor in an image correction device which generates a corrected image by geometric correction of an input image, comprising:

a step of receiving the input image by the processor;

a step of storing the input image in an image storage unit by the processor;

a step being performed by the processor and including, a substep of obtaining a light-direction vector in an objective space corresponding to each pixel position on the corrected image, based on a first projection center which is located on a rear side of a second projection center with respect to a direction of an optical axis associated with the input image, where the second projection center is a projection center of the input image in the objective space, a substep of obtaining from the light-direction vector an origin-based light-direction vector indicating a direction from the second projection center in which a point corresponding to said each pixel position exists in the objective space, a substep of obtaining as a resampling position a position on the input image corresponding to the origin-based light-direction vector, and a substep of determining a pixel value of each pixel of the corrected image, based on the resampling position and the input image stored in the image storage unit; and a step of outputting, by the processor, the corrected image in which the pixel value of each pixel is determined in the substep of determining.

6. A computer-readable non-transitory medium storing a program which makes a computer execute the correction-table generation method according to claim 4.

7. A computer-readable non-transitory medium storing a program which makes a computer execute the image correction method according to claim 5.

8. An image correction device according to claim 3, wherein the geometric correction unit obtains the position on the input image, using a composite function whose input data is each pixel position on the corrected image.

\* \* \* \* \*

UNITED STATES PATENT AND TRADEMARK OFFICE
CERTIFICATE OF CORRECTION

| | | |
|---|---|---|
| PATENT NO. | : 8,571,345 B2 | Page 1 of 1 |
| APPLICATION NO. | : 13/245451 | |
| DATED | : October 29, 2013 | |
| INVENTOR(S) | : Tsuyoshi Minakawa and Tatsuzo Hamada | |

It is certified that error appears in the above-identified patent and that said Letters Patent is hereby corrected as shown below:

ON THE TITLE PAGE

At item (73), lines 1 and 2, please delete "Hitachi Information & Communication Engineering, Ltd." and insert therefor --Hitachi Information & Telecommunication Engineering, Ltd.--.

Signed and Sealed this
Fifteenth Day of September, 2015

Michelle K. Lee
*Director of the United States Patent and Trademark Office*